(12) United States Patent
Sarkar et al.

(10) Patent No.: US 10,652,618 B2
(45) Date of Patent: May 12, 2020

(54) TRANSMITTING VIDEO CLIPS OF VIEWERS' REACTIONS DURING A BROADCAST OF A LIVE VIDEO STREAM

(71) Applicant: Facebook, Inc., Menlo Park, CA (US)

(72) Inventors: Shilpa Sarkar, San Francisco, CA (US); Ian McIntyre Silber, San Francisco, CA (US); Udeepta Dutta Bordoloi, Fremont, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/434,875

(22) Filed: Feb. 16, 2017

(65) Prior Publication Data
US 2018/0234738 A1    Aug. 16, 2018

(51) Int. Cl.
*H04N 21/472* (2011.01)
*H04N 21/4788* (2011.01)
(Continued)

(52) U.S. Cl.
CPC ....... *H04N 21/472* (2013.01); *H04N 21/2187* (2013.01); *H04N 21/2541* (2013.01); *H04N 21/2743* (2013.01); *H04N 21/4223* (2013.01); *H04N 21/4316* (2013.01); *H04N 21/4788* (2013.01)

(58) Field of Classification Search
None
See application file for complete search history.

(56) References Cited

U.S. PATENT DOCUMENTS

2004/0187148 A1* 9/2004 Cassella ............... H04H 20/38
                                                      725/35
2005/0262542 A1* 11/2005 DeWeese ............ H04L 12/1818
                                                      725/106
(Continued)

FOREIGN PATENT DOCUMENTS

WO    WO 2014/172022 A1    10/2014
WO    WO 2018/151741 A1    8/2018

OTHER PUBLICATIONS

International Search Report & Written Opinion as received in PCT/US2017/018954 dated Oct. 31, 2017.
(Continued)

*Primary Examiner* — Michael R Telan
(74) *Attorney, Agent, or Firm* — Keller Jolley Preece

(57) ABSTRACT

This disclosure covers systems and methods that both transmit a live video stream from a broadcaster device to viewer devices and relay video clips of reactions (by viewers to the live video stream) to the broadcaster device during presentation of the live video stream. In certain embodiments, the disclosed systems and methods facilitate viewers capturing video clips of reactions to a live video stream using a viewer device and, in turn, transmit video clips received from the viewer device to a broadcaster device during broadcast of the live video stream. For instance, in some embodiments, the systems and methods present the video clips of a viewer's reaction to the broadcaster device during a live-video-stream broadcast. Additionally, in some embodiments, the systems and methods present video clips of other viewers' reactions to a viewer device during a live-video-stream broadcast.

20 Claims, 16 Drawing Sheets

(51) Int. Cl.
*H04N 21/2187* (2011.01)
*H04N 21/254* (2011.01)
*H04N 21/431* (2011.01)
*H04N 21/2743* (2011.01)
*H04N 21/4223* (2011.01)

(56) References Cited

U.S. PATENT DOCUMENTS

| | | | |
|---|---|---|---|
| 2009/0249225 A1* | 10/2009 | Beswick | H04N 7/17309 |
| | | | 715/756 |
| 2010/0095318 A1 | 4/2010 | Wagner | |
| 2011/0197153 A1* | 8/2011 | King | G06F 3/04883 |
| | | | 715/769 |
| 2012/0019610 A1* | 1/2012 | Hornyak | H04M 1/2535 |
| | | | 348/14.02 |
| 2013/0117284 A1* | 5/2013 | Roozen | G06Q 10/10 |
| | | | 707/748 |
| 2014/0007147 A1 | 1/2014 | Anderson | |
| 2014/0019882 A1* | 1/2014 | Chew | G06Q 10/10 |
| | | | 715/753 |
| 2014/0172022 A1 | 6/2014 | Suh | |
| 2016/0007052 A1 | 1/2016 | Haitsuka et al. | |
| 2016/0057457 A1 | 2/2016 | Clements et al. | |
| 2016/0234551 A1* | 8/2016 | Allegretti | H04N 21/2407 |
| 2016/0277802 A1* | 9/2016 | Bernstein | H04N 21/4788 |
| 2016/0286244 A1 | 9/2016 | Chang et al. | |
| 2017/0034237 A1 | 2/2017 | Silver | |
| 2017/0208362 A1* | 7/2017 | Flores | H04N 21/44218 |

OTHER PUBLICATIONS

Extended European Search Report as received in European Application 17896397.1 dated Nov. 8, 2019.

* cited by examiner

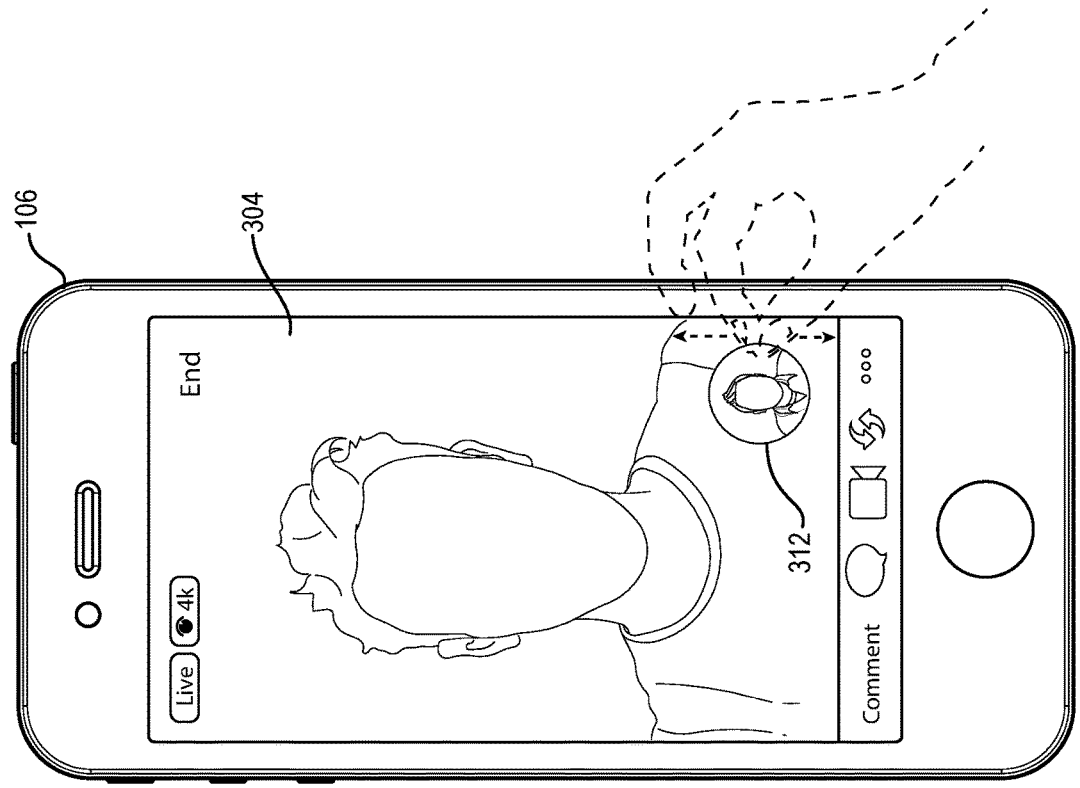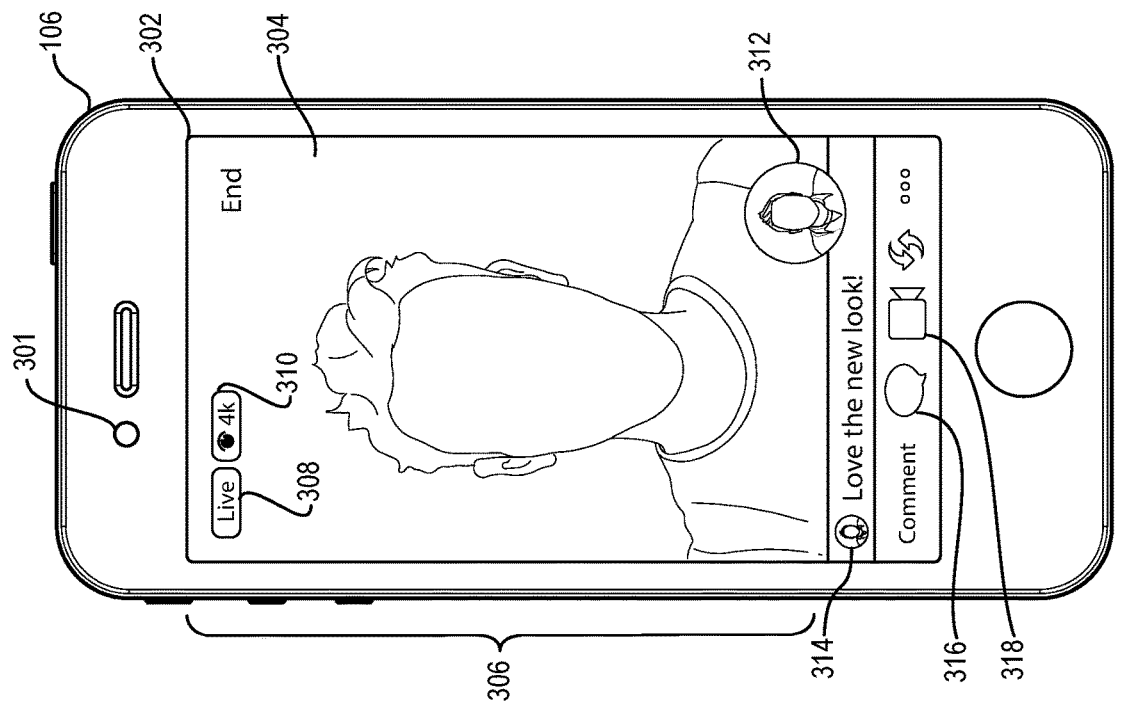
Fig. 3B
Fig. 3A

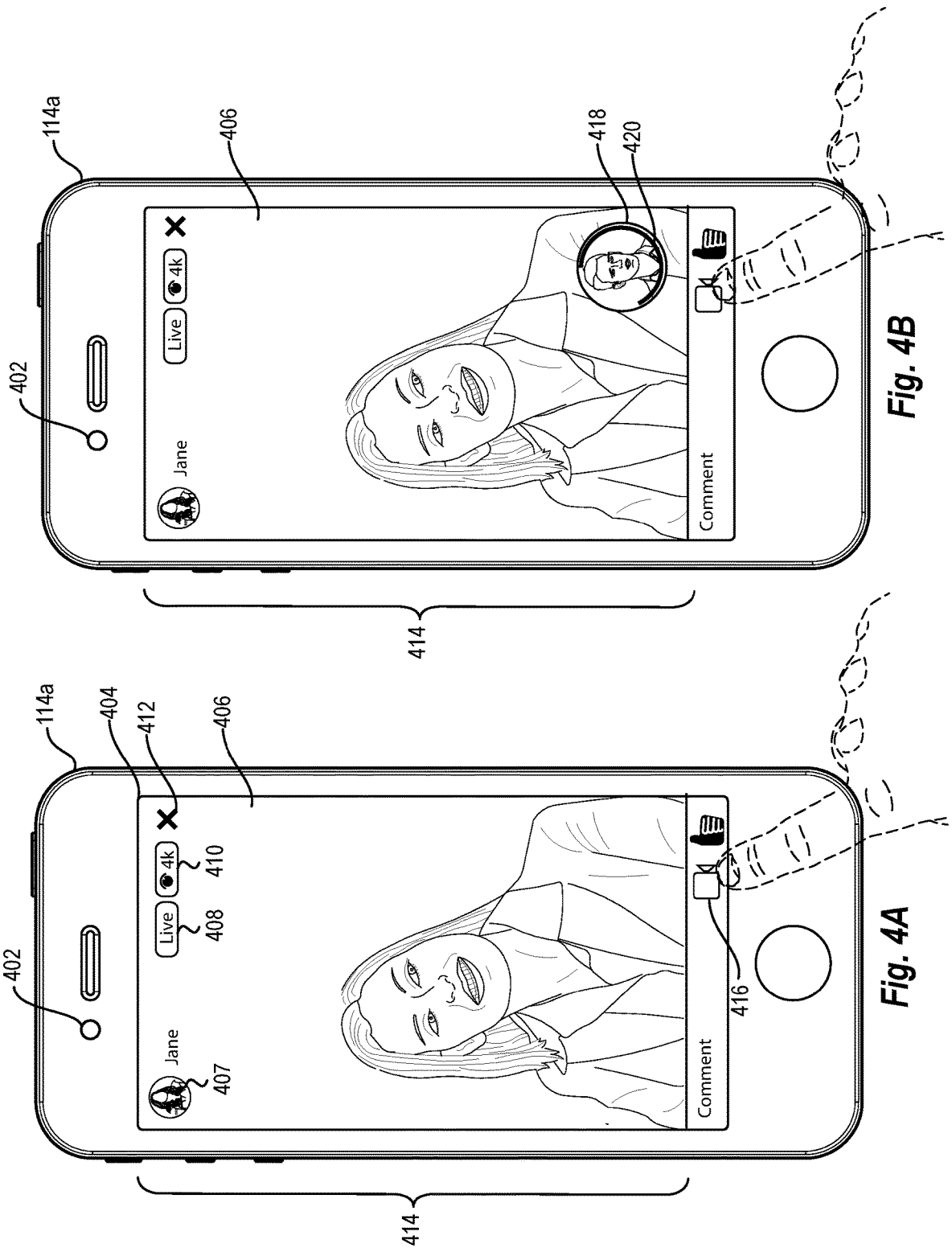

TRANSMITTING VIDEO CLIPS OF VIEWERS' REACTIONS DURING A BROADCAST OF A LIVE VIDEO STREAM

BACKGROUND

Network users increasingly use videos to communicate with each other through social networking systems. Whereas conventional social networking systems once limited users to communicate with written digital communications, some social networking systems currently provide options for users to send communications with a video captured by a personal computing device, such as a smart phone. For example, some social networking systems enable users to provide live video streams to other users of the social networking systems. In some instances, for instance, a social networking system uses an internal live-video-broadcasting system to broadcast a live video stream captured by a camera of a user's smartphone to other users connected to the social networking system.

Newscasters, politicians, businesses, and a variety of other users leverage live-video-stream options to quickly communicate with small or large audiences within a social networking system. During many live video streams, however, a broadcaster often lacks signals or feedback indicating whether an audience is engaging with the live video stream. Broadcasters lack feedback in such circumstances because social networking systems often transmit the live video stream to viewers in a one-way broadcast. Additionally, with many conventional live-video-broadcasting systems—including those internal to a social networking system—the broadcaster not only lacks information on whether the audience is engaging with the video, but also information indicating the viewers' reactions to the live video stream.

In addition to the limited feedback for a broadcaster, conventional live-video-broadcasting systems often lack options for a viewer to interact with the broadcaster during a live-video-stream broadcast. When using conventional live-video-broadcasting systems, moreover, viewers often also lack signals indicating other viewers' level of engagement with the same live video stream. Under such circumstances, each viewer may view the same live video stream in a vacuum—without interacting with the broadcaster or other viewers.

Accordingly, many conventional live-video-broadcasting systems lack suitable response mechanisms for a broadcaster to receive real-time indication of viewers' feedback, for viewers to engage with a broadcaster, and, similarly, for viewers to receive an indication of other viewers' levels of engagement.

SUMMARY

This disclosure describes solutions to some or all the foregoing problems with systems and methods that both transmit a live video stream from a broadcaster device to viewer devices and relay video clips of reactions (by viewers to the live video stream) to the broadcaster device during presentation of the live video stream. The disclosed systems and methods facilitate viewers capturing video clips of reactions to a live video stream using a viewer device and, in turn, transmit video clips received from the viewer device to a broadcaster device during broadcast of the live video stream. In some embodiments, for instance, the systems and methods present the video clips of a viewer's reaction to the broadcaster device during a live-video-stream broadcast. In additional or alternative embodiments, the systems and methods present video clips of other viewers' reactions to a viewer device during the live-video-stream broadcast.

For example, in certain embodiments, the systems and methods receive a live video stream from a broadcaster device for broadcast to a group of viewers. The disclosed systems and methods then transmit the live video stream to viewer devices for the group of viewers. While at least some of the viewer devices present the live video stream, the systems and methods receive a video clip of a viewer's reaction to the live stream that the viewer captured using a viewer device. While the live video stream continues to broadcast, the systems and methods transmit the video clip to the broadcaster device for the broadcaster device to present to the broadcaster.

By receiving and transmitting video clips of reactions during a live-video-stream broadcast, the disclosed systems and methods enable viewers to engage with the live video stream (and the broadcaster) with a visual reaction to the live video stream. The video clip provides a more personalized and visual form of reaction than other reaction options provided by conventional live-video-broadcasting systems. It further provides a real-time response option that incentivizes a viewer to engage with a live video stream.

In some embodiments, the disclosed methods and systems not only incentivize viewers by providing a personalized and visual reaction with a video clip, but the video clip may also include elements with which viewers may interact during a live-video-stream broadcast. For example, in some embodiments, the disclosed systems and methods transmit a video clip for presentation by a broadcaster device (or by a viewer device) within a graphical element overlaid on a display of the live video stream. In such cases, the video clip facilitates an interactive user experience for the broadcaster (and sometimes for other viewers) during a live-video-stream broadcast. As presented in some embodiments, a broadcaster or viewer may interact with the video clip within the graphical element to, for example, comment on the video clip, send a follow request, or maintain a view of the video clip overlaid on the live video stream during a broadcast.

In addition to providing more engagement, interaction, and real-time response with a video clip, the disclosed systems and methods further provide control over when and which viewers may share a video clip of a reaction. For example, in some embodiments, the disclosed methods and systems selectively activate—on some (or all) viewer devices—a reaction-video element to capture video clips of reactions by viewers. The systems and methods may selectively activate the reaction-video element when, for example, a broadcaster has granted certain viewers permission to add video clips of their reactions to a live video stream or when fewer than a threshold number of viewers are viewing the live video stream.

The following description sets forth additional features and advantages of the social networking system. Some of these additional features and advantages will be obvious from the description or may be learned by the practice of such embodiments. A person having ordinary skill in the art may realize and obtain the features and advantages of these embodiments through the systems and methods particularly pointed out in the appended claims.

BRIEF DESCRIPTION OF THE DRAWINGS

Below is a brief description of the figures the detailed description references.

FIGS. 3A-3H illustrate user interfaces of a broadcaster device that comprise a video clip of a reaction to a live video stream in accordance with one or more embodiments.

FIGS. 4A-4F illustrate user interfaces of a viewer device that comprise a video clip of a reaction to a live video stream in accordance with one or more embodiments.

DETAILED DESCRIPTION

Figure 1:
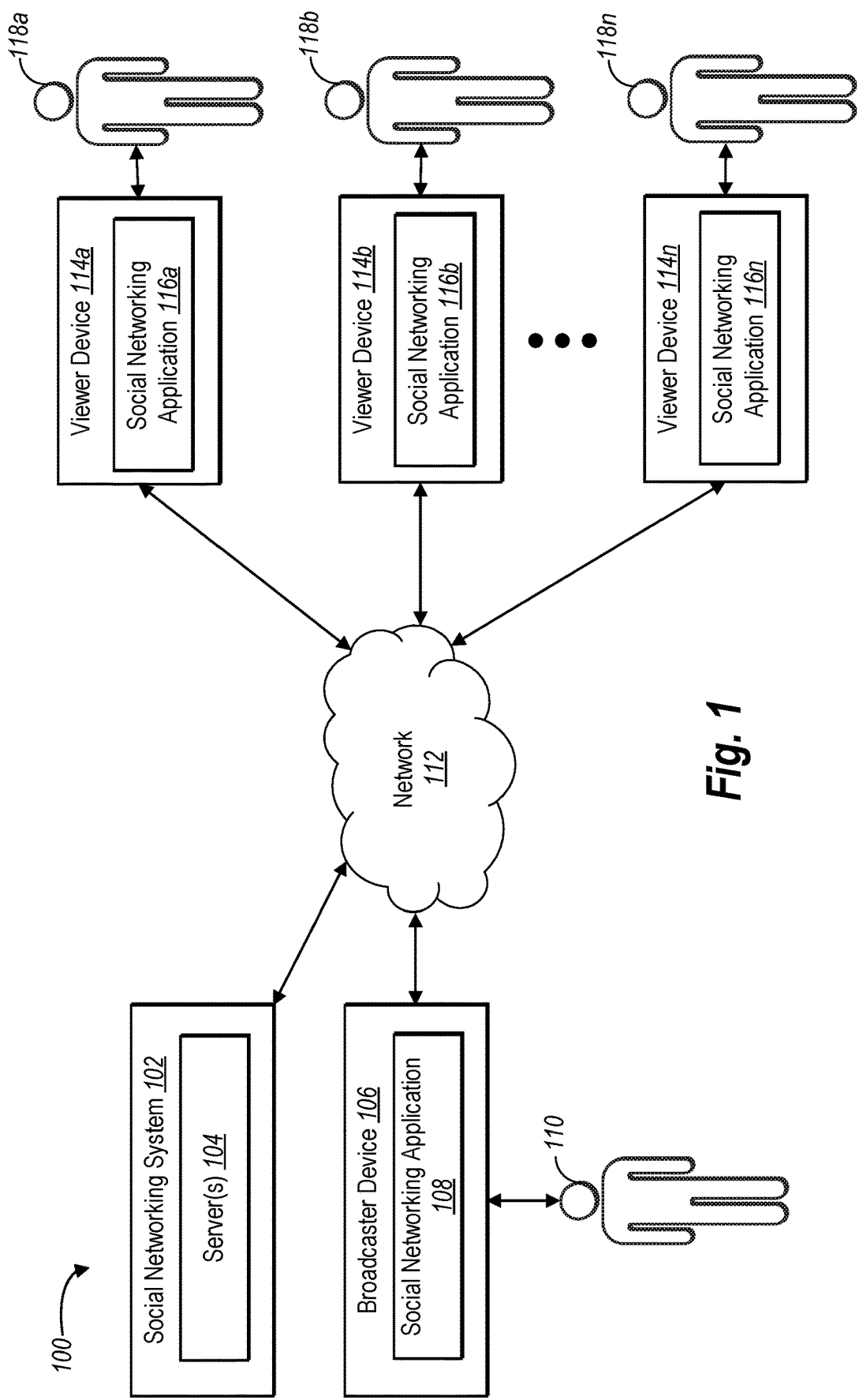
FIG. 1 illustrates a block diagram of an environment for implementing a system in accordance with one or more embodiments.

This disclosure describes one or more embodiments of a system that both transmits a live video stream from a broadcaster device to viewer devices and relays video clips of reactions (by viewers to the live video stream) to the broadcaster device during presentation of the live video stream. The disclosed system enables viewers to capture video clips of reactions to a live video stream using a viewer device and, in turn, transmits video clips received from the viewer device to a broadcaster device during broadcast of the live video stream. In some embodiments, for instance, the system transmits video clips of a viewer's reaction to the broadcaster device for presentation on the broadcaster device during broadcast of the live video stream. In some embodiments, the system additionally transmits video clips of other viewers' reactions for presentation on a viewer device during broadcast of the live video stream.

For example, in certain embodiments, the system receives a live video stream from a broadcaster device for broadcast to a group of viewers. The system then transmits the live video stream to viewer devices for the group of viewers. While at least some of the viewer devices present the live video stream, the system receives a video clip of a viewer's reaction to the live stream that the viewer captured using a viewer device. The system then transmits the video clip to the broadcaster device for the broadcaster device to present to the broadcaster while the system receives the live video stream from the broadcaster device. In some embodiments, the system likewise transmits the video clip to some (or all) of the viewer devices for the viewer devices to present with the live video stream.

By receiving and transmitting video clips of reactions during a live-video-stream broadcast, the disclosed system enables viewers to engage with the live video stream and the broadcaster with a visual reaction to the live video stream. The video clip provides a more personalized and visual form of reaction than other reaction options provided by conventional live-video-broadcasting systems. It further provides a real-time response option that incentivizes a viewer to engage with a live video stream.

In some embodiments, the disclosed system not only incentivizes viewers by providing a personalized and visual reaction with a video clip, but it also adds another element with which viewers may interact during a live-video-stream broadcast. For example, in some embodiments, the system transmits a video clip for presentation by a broadcaster device (or by a viewer device) within a graphical element overlaid on the display of the live video stream. Similarly, in some embodiments, the social networking system transmits additional video clips of additional viewers' reactions for presentation by the broadcaster device (or by the viewer device) within graphical elements overlaid on the live video stream. In such cases, the video clip within the graphical element facilitates an interactive user experience for the broadcaster (and sometimes for other viewers) during a live-video-stream broadcast. As presented in some embodiments, a broadcaster or viewer may interact with the video clip within the graphical element to, for example, comment on the video clip, send a follow request, or maintain a view of the video clip overlaid on the live video stream during a broadcast.

Accordingly, the disclosed system provides an interactive visual reaction that fills the interactive vacuum present in some conventional live-video-broadcasting systems. In some embodiments, the disclosed system fills that vacuum with a time-limited video clip that both conveys a visual reaction of a viewer and avoids overshadowing content chosen by a broadcaster within the live video stream. The disclosed system, in some instances, also enables the broadcaster to control whether and to what extent viewers view video clips captured by other viewers.

In addition to providing more engagement, interaction, and real-time response provided with a video clip, in some embodiments, the system further provides control over when and which viewers may share a video clip of a reaction. For example, in some embodiments, the disclosed system selectively activates—on some (or all) viewer devices—a reaction-video element to capture video clips of reactions by viewers. The system may selectively activate the reaction-video element when, for example, a broadcaster has granted certain viewers permission to add video clips of their reactions to a live video stream or when fewer than a threshold number of viewers are viewing the live video stream.

For explanatory purposes, this disclosure uses several terms with the following definitions. The term "live video stream" refers to a sequence of digitally encoded data used to transmit a live video from a broadcaster device without significant delay. Accordingly, as used in this disclosure, a live video stream comprises a transmission of data from one computing device to another computing device (or to multiple computing devices), including a server or group of servers. A live video stream further comprises a one-way broadcast of the data from a server (or group of servers) to a viewer device (or multiple viewer devices). For example, a system may transmit a live video stream received from a mobile device—within milliseconds or seconds of the mobile device capturing a video—to other mobile devices for presentation by the other mobile devices within an interface of a social networking application.

As also used in this disclosure, the term "video clip" refers to a time-limited video of relatively short duration. For example, in some embodiments, a video clip includes a four-second video that shows a viewer's face reacting to a live video stream as captured by a viewer device. In some embodiments, the system imposes a maximum duration of the video clip such that a recorded video clip may not exceed the maximum duration. Although the video clip may show a viewer's face as a reaction to a live video stream, the video clip may likewise show other forms of reaction, such as a hand wave or other gesture. Moreover, a video clip may have a shorter or longer duration than four seconds, such as three seconds or twenty-five seconds. Additionally, a video clip may be a segment of a longer video or be a stand-alone video that is not a segment of a longer video.

Turning now to the figures, FIG. 1 illustrates a block diagram of one embodiment of a system environment 100 in which a social networking system 102 operates. As illustrated in FIG. 1, the system environment 100 includes the social networking system 102, including server(s) 104. The system environment 100 further includes a broadcaster device 106 and viewer devices 114a, 114b, through 114n (collectively referred to as "viewer devices 114"). As depicted in FIG. 1, the broadcaster device 106 has an associated user 110. Similarly, each of the viewer devices 114 have an associated user 118—with a user 118a associated with the viewer device 114a, a user 118b associated with the viewer device 114b, and a user 118n associated with the viewer device 114n (collectively referred to as "users 118").

The user 110 shown in FIG. 1 is a broadcaster that initiates a live video stream. Accordingly, this disclosure often describes the user 110 associated with the broadcaster device 106 as a broadcaster. Conversely, the users 118 shown in FIG. 1 are viewers of the live video stream. Accordingly, this disclosure often describes the users 118 associated with the viewer devices 114 as viewers. Although FIG. 1 illustrates a particular number of viewer devices 114 and a number of associated users 118, the system environment 100 may include any number of viewer devices and any number of associated users.

As illustrated in FIG. 1, the broadcaster device 106 and the viewer devices 114 can communicate with the social networking system 102, including the server(s) 104, over a network 112. Additional details related to the social networking system 102 are discussed below with reference to FIGS. 9-10. In addition, the network 112 may represent a network or collection of networks, such as the Internet, a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. Thus, the network 112 may be any suitable network over which the broadcaster device 106 and viewer devices 114 (or other components) may access the social networking system 102 (or vice versa).

As described below, the server(s) 104 can enable the various functions, features, processes, methods, and systems described in this disclosure using, for example, instructions within the social networking system 102. Additionally, or alternatively, the server(s) 104 coordinate with the broadcaster device 106 and/or the viewer devices 114 to perform or provide the various functions, features, processes, methods, and systems described in more detail below. Although FIG. 1 illustrates a particular arrangement of the social networking system 102, server(s) 104, broadcaster device 106, network 112, and viewer devices 114, various additional arrangements are possible. For example, the social networking system 102 and the server(s) 104 may directly communicate with the broadcaster device 106 and/or the viewer devices 114 and thus bypass the network 112.

Generally, the broadcaster device 106 and viewer devices 114 can include any one of various types of client devices. For example, the broadcaster device 106 or viewer devices 114 can include a mobile device (e.g., a smart phone), tablet, laptop computer, desktop computer, television, or any other type of computing device as further explained below with reference to FIG. 8. Additionally, the server(s) 104 can include one or more computing devices including those explained below with reference to FIG. 8. Moreover, the server(s) 104, social networking system 102, broadcaster device 106, network 112, and viewer devices 114 may communicate using any communication platforms and technologies suitable for transporting data and/or communication signals, including any known communication technologies, devices, media, and protocols supportive of data communications, examples of which are described below with reference to FIG. 9.

As an overview of the system environment 100, the server(s) 104 provide the broadcaster device 106 and viewer devices 114 access to the social networking system 102 through the network 112. In one or more embodiments, when accessing the server(s) 104 of the social networking system 102, the broadcaster device 106 transmits digitally encoded data to the social networking system 102, such as digitally encoded data representing a live video stream, a post, an instant message, or a comment. The social networking system 102 can provide, for example, a website that enables the user 110 to initiate a live video stream or to post, send, edit, delete, or perform other actions with respect to digital communications within the social networking system 102. Conversely, in one or more embodiments, when the viewer devices 114 access the server(s) 104 of the social networking system 102 (e.g., through a website), the viewer devices 114 receive a transmission of digitally encoded data from the social networking system 102, such as digitally encoded data representing the live video stream, post, instant message, or comment.

Alternatively, the broadcaster device 106 and viewer devices 114 communicate with the server(s) 104 of the social networking system 102 via a dedicated application on the broadcaster device 106 and viewer device 114, respectively. In particular, and as further shown in FIG. 1, the broadcaster device 106 and the viewer devices 114 each have an associated social networking application—with a social networking application 108 associated with the broadcaster device 106, a social networking application 116a associated with the viewer device 114a, a social networking application 116b associated with the viewer device 114b, and a social networking application 116n associated with the viewer device 114n. This disclosure refers to the social networking applications 116a, 116b, and 116n collectively as "social networking applications 116."

In some embodiments, the social networking application 108 and the social networking applications 116 comprise web browsers, applets, or other software applications (e.g., a native applications) available to the broadcaster device 106 and the viewer devices 114, respectively. In some instances, the social networking system 102 provides data packets comprising the social networking application 108 or the social networking applications 116 to the broadcaster device 106 and viewer devices 114, respectively (e.g., by providing data representing a software application to a mobile device).

The broadcaster device 106 may launch the social networking application 108 to facilitate interacting with the social networking system 102. In some such embodiments, the social networking application 108 coordinates communications between the broadcaster device 106 and the server (s) 104 such that, for example, the broadcaster device 106 transmits a live video stream to the social networking system 102 (and the social networking system 102 in turn transmits the live video stream to the viewer devices 114) or access webpages of the social networking system 102.

To facilitate user interaction with the social networking system 102, the social networking application 108 can comprise one or more graphical user interfaces associated with the social networking system 102; receive indications of interactions of the user 110 with the graphical user interfaces; and perform various requests, queries, or responses to other user input. By comparison, the social networking applications 116 may perform the same functions for the viewer devices 114 (and users 118) as the social networking application 108 performs for the broadcaster device 106 (and user 110).

For example, the graphical user interfaces of the social networking application 108 and social networking applications 116 facilitate the transmission of both live video streams and video clips of reactions to the live video stream. Based on detecting an interaction between the user 110 and a graphical user interface (provided by the broadcaster device 106)—such as a selection of a live-video-stream element—the broadcaster device 106 transmits a live video stream to the social networking system 102 for broadcast to a group of viewers. Upon receiving the live video stream, the social networking system 102 transmits the live video stream to the viewer devices 114. Conversely, based on detecting an interaction between the user 118a and a graphical user interface (provided by the viewer device 114a)—such as a selection of a reaction-video element—the viewer device 114a records a video clip of a reaction by the user 118a to the live video stream and transmits the video clip to the social networking system 102. The social networking system 102 then transmits the video clip to the broadcaster device 106 for the broadcaster device 106 to present (and/or to the viewer devices 114b and 114n for the viewer devices 114b and 114n to present) while the social networking system 102 continues to receive the live video stream from the broadcaster device 106.

Figure 2A:
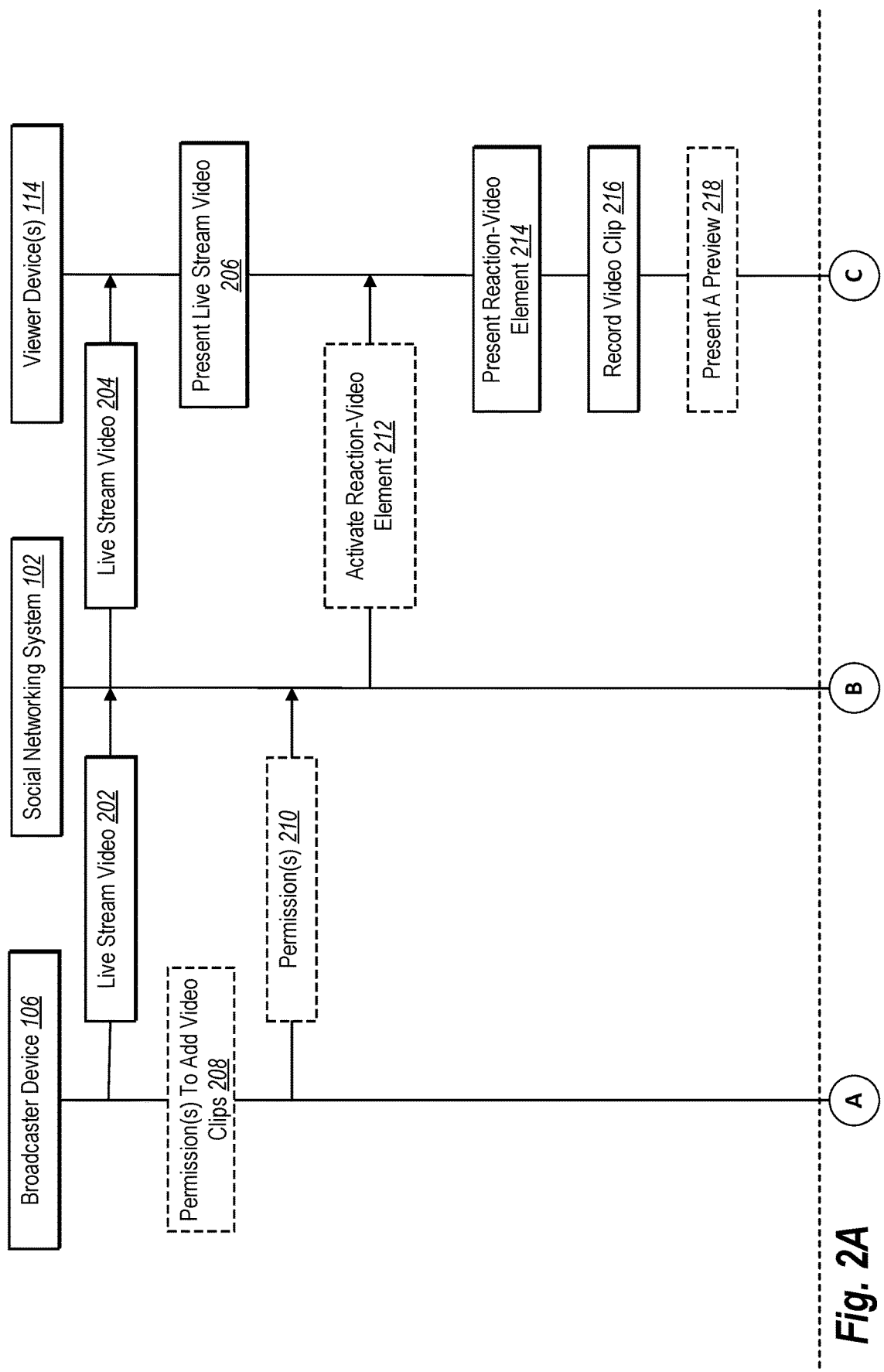
FIGS. 2A-2B illustrate a sequence-flow diagram of relaying video clips of reactions by viewers to a live video stream in accordance with one or more embodiments.
Figure 2B:
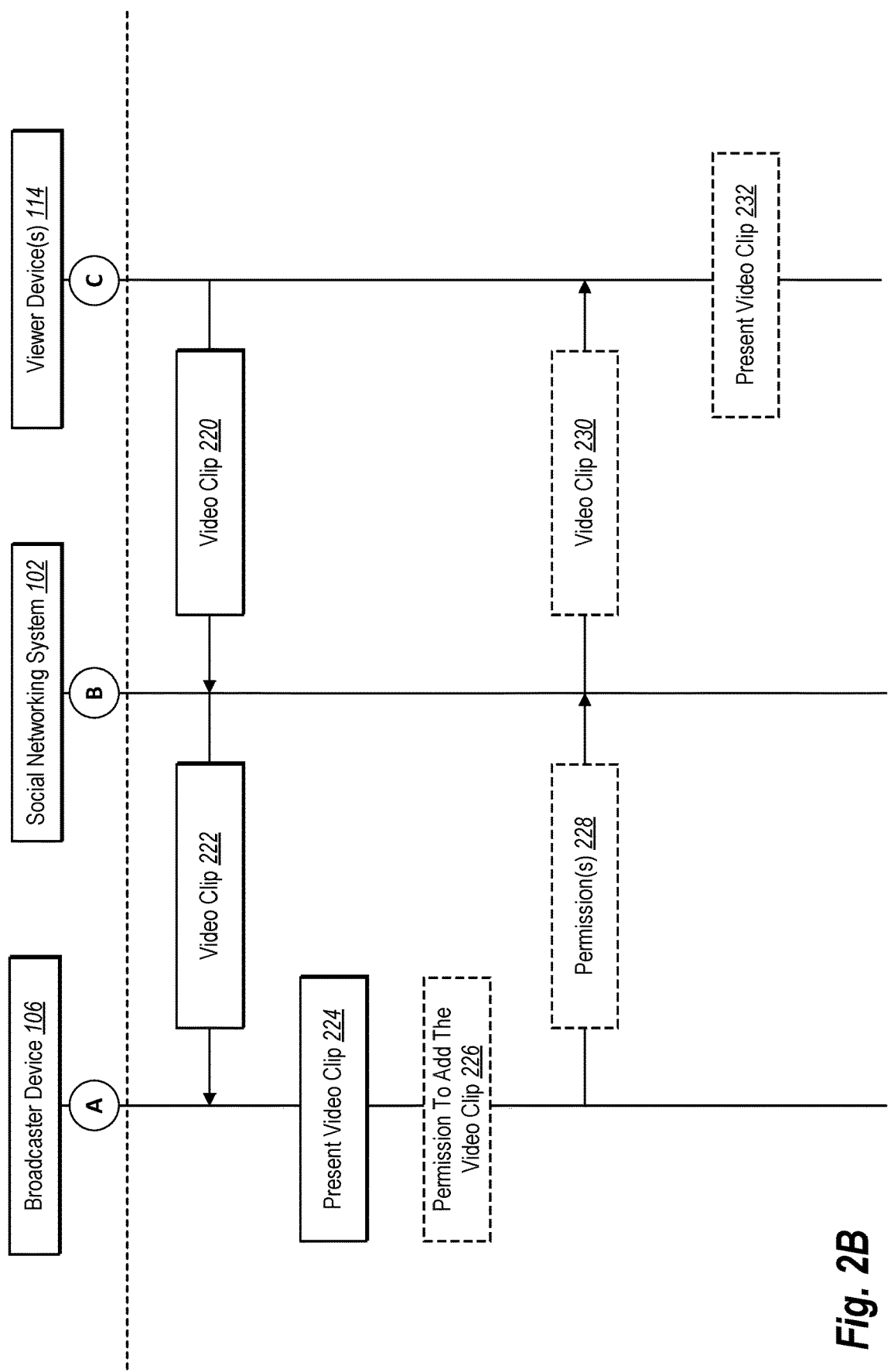

Turning now to FIGS. 2A-2B, these figures provide an overview of embodiments of the social networking system 102 that relay video clips of a reaction to a live video stream during a live-video-stream broadcast. Specifically, FIGS. 2A-2B illustrate a representation of a sequence of acts 202-232 that the social networking system 102, the broadcaster device 106, or the viewer devices 114 perform to transmit a live video stream and video clips of reactions by viewers to the live video stream. For instance, in some embodiments, the social networking system 102, broadcaster device 106, or viewer devices 114 include computer-executable instructions that, when executed by a processor thereon, cause the social networking system 102, broadcaster device 106, or viewer devices 114 to perform one of the acts 202-232 shown in the sequence-flow diagram of FIGS. 2A-2B.

Consistent with the disclosure above, in some embodiments, the broadcaster device 106 transmits (and the social networking system 102 receives) a live video stream that the social networking system 102 then transmits to the viewer devices 114. As shown in FIG. 2A, the broadcaster device 106 performs the act 202 of transmitting a live video stream to the social networking system 102, and the social networking system 102 performs the act 204 of transmitting the live video stream to the viewer devices 114. For example, act 202 can include the broadcaster device 106 transmitting a live video stream (captured by a camera of the broadcaster device 106) to the social networking system 102. Moreover, act 204 can include the social networking system 102 transmitting the live video stream to the viewer devices 114 within seconds or milliseconds of receiving the live video stream from the broadcaster device 106 and while continuing to receive the live video stream from the broadcaster device 106.

After receiving the live video stream from the social networking system 102, the viewer devices 114 perform the act 206 of presenting the live video stream to viewers. For example, act 206 may include the viewer devices 114 presenting the live video stream to viewers within graphical user interfaces of the social networking applications 116. This disclosure describes presentation of a live video stream by one of the viewer devices 114 in more detail below with reference to FIG. 4A.

As indicated above, in some embodiments, the social networking system 102 receives indications of permissions granted by a broadcaster to viewers (or potential viewers) with respect to live video streams. As shown in FIG. 2A, for example, the broadcaster device 106 optionally performs both the act 208 of detecting permission(s) to add video clips of reactions to a live video stream and the act 210 of sending an indication of the detected permission(s) to the social networking system 102. For example, act 208 may comprise detecting permissions granted by a broadcaster for a particular viewer, potential viewer, group of viewers, or potential group of viewers to add video clips of their reactions to a live-video-stream broadcast.

In some embodiments, for instance, the broadcaster device 106 detects an interaction between the user 110 and a graphical user interface of the social networking application 108 that indicates granting permission for a viewer, potential viewer, group of viewers, or potential group of viewers to add video clips to the live-video-stream broadcast. The detected permission may comprise a permission for a variety of users to add video clips to the live-video-stream broadcast of a broadcaster, including a permission for a particular user of the social networking system 102, users of the social networking system 102 associated with an organization, friends or followers of the broadcaster, or the public to add video clips. Additionally, the detected permission may comprise a permission for users to add video clips to either a particular live video stream or future live video streams from a broadcaster.

To facilitate detection of such permissions, in some embodiments, the social networking system 102 provides a suggested viewer (or a suggested group of viewers) to a broadcaster as candidates to add video clips to a live video stream (or future live video streams). For example, the social networking system 102 may use a social graph (e.g., social graph 1000 in FIG. 10) to determine that a user of the social networking system 102 has an affinity coefficient relative to the broadcaster above a threshold. In this example, the threshold affinity coefficient serves as a marker for selecting a candidate viewer who may add video clips to a live video stream. In one such example, the social networking system 102 may determine that a friend or follower of the broadcaster who frequently reacts to (or views) posts or live video streams of the broadcaster exceeds a threshold affinity coefficient relative to the broadcaster based on nodes representing the broadcaster and the friend or follower and edges connecting such nodes within the social graph. Alternatively, the social networking system 102 may use the social graph (e.g., social graph 1000 in FIG. 10) to determine that the broadcaster has an affinity coefficient relative to an organization above a threshold for purposes of selecting a candidate group of viewers who may add video clips to a live video stream. In one such example, the social networking system 102 determines that the broadcaster exceeds a threshold affinity coefficient relative to several followers associated with an organization based on nodes representing the broadcaster and the followers associated with the organization and edges connecting such nodes within the social graph. This disclosure describes how the social networking system 102 determines affinity coefficients below in more detail with reference to FIG. 10.

Based on determining affinity coefficients, the social networking system 102, in certain embodiments, provides a suggested viewer (or a suggested group of viewers) to the broadcaster—as candidates for permission to add video clips to a live video stream—for display within a graphical user interface of the social networking application 108. Upon receiving the suggestions, in some embodiments, the broadcaster device 106 presents the candidates within selectable options of the graphical user interface of the social networking application 108. In such embodiments, the broadcaster device 106 detects user interaction between the user 110 and the selectable options when detecting a selection to grant permission to a particular candidate to add video clips to a live video stream.

Additionally, in some embodiments, the detected permission(s) of act 208 (and sent permission(s) of act 210) trigger the social networking system 102 to activate elements on some of the viewer devices 114 to enable capturing video clips of reactions to the live video stream. As shown in FIG. 2A, for example, the social networking system 102 optionally performs the act 212 of activating a reaction-video element on some or all the viewer devices 114. As used in this disclosure, the term "reaction-video element" refers to a selectable option to capture a video clip of a reaction to a live video stream. For example, a reaction-video element includes a selection option within the social networking application 116a that—when selected by the user 118a—causes a camera of the viewer device 114a to record a video clip of a reaction by the user 118a to the live video stream. This disclosure further describes an embodiment of a reaction-video element below with reference to FIGS. 4A-4B.

When performing act 212, the social networking system 102, in some embodiments, sends a communication or signal to one or more of the viewer devices 114 that causes the corresponding viewer devices 114 to activate a reaction-video element within the social networking applications 116. Under certain circumstances, the social networking system 102 activates the reaction-video element on some or all the viewer devices 114 (if any) based on, for example, various permissions or activation settings.

As suggested above, in some embodiments, the social networking system 102 activates the reaction-video element on some or all the viewer devices 114 based on permissions granted by the broadcaster. Accordingly, when performing act 212, the social networking system 102 selects certain of the viewer devices 114 on which to activate the reaction-video element according to any of the permissions described above in connection with act 208, such as permissions granted for a particular user of the social networking system 102, a group of potential viewers selected from among suggested candidates, or the public.

In addition or in the alternative, in certain embodiments, the social networking system 102 selectively activates the reaction-video element on viewer devices 114 based on activation settings specifying that certain of the viewer devices 114 may add video clips to the live video stream. For instance, the activation settings may specify that the social networking system 102 selectively activate the reaction-video element on one or more of the viewer devices 114 based on determinations by the social networking system 102. In some such embodiments, the social networking system 102 activates the reaction-video element on certain of the viewer devices 114 based on determining that fewer than a threshold number of viewers are viewing the live video stream (e.g., activating all or only certain of the viewer devices 114 when fewer than twenty viewers are viewing the live video stream), determining that certain of the viewer devices 114 correspond to viewer accounts of friends or followers of the broadcaster (e.g., friends or followers of a broadcaster account corresponding to the broadcaster device 106), or determining that an affinity coefficient for a viewer corresponding to certain of the viewer devices 114 exceeds a threshold affinity coefficient relative to the broadcaster (e.g., an affinity coefficient for a viewer account corresponding to the viewer device 114a exceeds a threshold affinity coefficient relative to a broadcaster account corresponding to the broadcaster device 106).

Once the reaction-video element has been activated on one of the viewer devices 114, the social networking system 102 enables the corresponding viewer device 114 to capture a video clip to potentially add to the live-video-stream broadcast. As shown in FIG. 2A, for example, the viewer devices 114 perform the act 214 of presenting the reaction-video element and the act 216 of recording a video clip. For explanatory purposes, this disclosure describes the viewer device 114a as performing acts 214-218. But any of the viewer devices 114 on which the reaction-video element has been activated may perform the acts 214-218, as described herein.

In some embodiments, act 214 includes the viewer device 114a presenting the reaction-video element within a graphical user interface of the social networking application 116a. For example, the viewer device 114a optionally presents both the live video stream and the reaction-video element within the same graphical user interface during a live-video-stream broadcast. When presented with the graphical user interface, a viewer may interact with the reaction-video element to start or stop recording a video clip of a reaction by the viewer to a live video stream.

For instance, when the viewer device 114a detects an initiating user interaction with the reaction-video element (e.g., a touch gesture or mouse click), a camera of the viewer device 114a starts to perform act 216 of recording a video clip. Conversely, when the viewer device 114a detects a terminating user interaction with the reaction-video element (e.g., another touch gesture, a release of the initiating touch gesture, or mouse click), the camera of the viewer device 114a stops performing act 216 of recording a video clip. Alternatively, in some embodiments, the social networking application 116a causes the camera to stop recording the video clip after a predetermined time has lapsed (e.g., four seconds, ten seconds).

In addition to capturing the video clip, the viewer devices 114 optionally provide functionalities that enable a viewer to control transmission and other aspects of the video clip. As shown in FIG. 2A, for example, the viewer device 114a optionally performs the act 218 of presenting a preview of the video clip. For example, the act 218 may include the viewer device 114a presenting a preview of the video clip within a graphical user interface of the social networking application 116a, such as a preview of the entire video clip before the viewer device 114a transmits the video clip to the social networking system 102.

As part of or in addition to the preview, in some embodiments, the viewer device 114a also provides an option to share the video clip with a broadcaster or with other viewers of the live video stream. Accordingly, the viewer device 114a optionally provides a viewer control over whether to transmit the recorded video clip and to whom to transmit the video clip. By contrast, in some alternative embodiments, the social networking system 102 directs the viewer device 114a to automatically transmit the video clip without a preview, including transmission to the broadcaster device 106 and/or other viewer devices 114. This disclosure describes an embodiment of a preview in more detail below with reference to FIG. 4C.

Independent of whether the viewer device 114a presents a preview or provides controls over transmission of the video clip, in some embodiments, the viewer device 114a shares the video clip with the broadcaster device 106. As shown in FIG. 2B, for example, the viewer device 114a performs the act 220 of transmitting the video clip to the social networking system 102, and the social networking system 102 performs the act 222 of transmitting the video clip to the broadcaster device 106. Similar to the transmission of the live video stream, act 222 can include the social networking system 102 transmitting the video clip to the broadcaster device 106 within seconds or milliseconds of receiving the video clip from the viewer device 114a.

Upon receiving the video clip, the broadcaster device 106 performs the act 224 of presenting the video clip. Act 224 may include, for instance, the broadcaster device 106 presenting the video clip within a graphical user interface of the social networking application 108 while the broadcaster device 106 captures the live video stream. In some embodiments, the broadcaster device 106 presents both the live video stream and the video clip within the same graphical user interface. For example, the broadcaster device 106 presents the video clip within a graphical element overlaid on the live video stream within the graphical user interface. This disclosure describes an embodiment of the broadcaster device 106 presenting the video clip below with reference to FIGS. 3A-3H.

In addition or in the alternative to the transmissions and granted permissions described above, in certain embodiments, the social networking system 102 provides a different process of controlling whether the system 102 adds a video clip to a live video stream. In this optional process, the social networking system 102 determines, for example, whether a broadcaster permits a particular video clip to be added to a live video stream. As shown in FIG. 2B, the broadcaster device 106 optionally performs both the act 226 of detecting a permission to add a video clip to a live video stream and the act 228 of sending an indication of the detected permission to the social networking system 102.

In one such example, act 226 may include detecting a permission granted by a broadcaster for a particular video clip to be added to a live video stream while (or after) the broadcaster device 106 presents the video clip to the broadcaster. In some embodiments, the broadcaster device 106 detects a user interaction with the video clip during presentation of the video clip within a graphical user interface. The user interaction may, for example, comprise a touch gesture or mouse click that causes the broadcaster device 106 to generate a menu of permissions and/or other options.

In some such embodiments, the menu includes several permission options, including a selectable option for the broadcaster to grant permission for the video clip to be included in the live video stream for a group of viewers, a selectable option for the broadcaster to grant permission for a particular viewer (who captured the video clip) to add video clips to future live video streams from the broadcaster, or a selectable option for the broadcaster to deny permission for the video clip to be included in the live video stream for a group of viewers. While the preceding embodiment comprises a menu of permissions, the broadcaster device 106 alternatively presents the permission options serially or in some other suitable organization.

Some embodiments of the social networking system 102 provide permission options for video clips according to different occurrences or schedules. For example, in some embodiments, the social networking system 102 directs the broadcaster device 106 to provide permission options for each video clip regardless of an identity of the viewer or of a number of video clips previously added by the viewer to live video streams of the broadcaster. In other embodiments, however, the social networking system 102 directs the broadcaster device 106 to provide permission options for selected video clips only before adding the video clips to the live video stream, such providing permission options for an initial video clip (or an initial number of video clips) from a particular viewer during a live-video-stream broadcast. Moreover, in some embodiments, the social networking system 102 directs the broadcaster device 106 to provide permission options for selected video clips when a viewer initially transmits a video clip from the viewer device 114a to the broadcaster device 106 and—if the broadcaster grants permission—not for subsequent transmissions of video clips of the viewer from the viewer device 114a to the broadcaster device 106.

Regardless of whether, when, or how the broadcaster device 106 detects a permission to add a video clip to a live video stream, in some embodiments, the social networking system 102 transmits video clips to some or all the viewer devices 114 for presentation with the live video stream. As shown in FIG. 2B, for example, the social networking system 102 optionally performs the act 230 of transmitting the video clip to some or all the viewer devices 114, and the corresponding viewer devices 114 perform the act 232 of presenting the video clip.

For instance, act 232 may include certain of the viewer devices 114 presenting the video clip within a graphical user interface of one of the social networking applications 116—while the viewer device 114 present the live video stream. In some embodiments, the certain of the viewer devices 114 present the video clip within a graphical element overlaid on the live video stream within the graphical user interface. For example, certain of the viewer devices 114 may present both the live video stream and the video clip within the same graphical user interface.

Turning now to FIGS. 3A-3H, these figures illustrate a live video stream and a video clip of a reaction to the live video stream from the perspective of a broadcaster device (e.g., broadcaster device 106). As described below, FIGS. 3A-3H further illustrate certain embodiments in which an example of the broadcaster device 106 displays options or alters an appearance or location of the video clip in response to user interactions with a graphical user interface. While this disclosure refers to touch gestures or mouse clicks as examples of user interactions when describing FIGS. 3A-3H, in additional or alternative embodiments, the broadcaster device 106 detects any suitable user interaction, including a stylus interaction or a keyboard input.

As shown in FIG. 3A, for example, the broadcaster device 106 includes a touch screen display 302 that facilitates presentation of a live video stream. In response to a broadcaster selecting a live-transmission option (not shown) or another option associated with a live video stream, a camera 301 of the broadcaster device 106 captures a video from the broadcaster's perspective, the broadcaster device 106 transmits a live video stream to the social networking system 102, and the broadcaster device 106 presents the live video stream within a live-video-stream GUI 304 via the touch screen display 302. The broadcaster device 106 thus presents a display of the live video stream for the broadcaster during a live-video-stream broadcast.

In one or more embodiments, the live-video-stream GUI 304 includes a live indicator 308, a viewer indicator 310, and a live-video-stream display 306. The live indicator 308 indicates to the broadcaster that the social networking system 102 is currently broadcasting the live video captured by the camera 301. Additionally, the viewer indicator 310 indicates a number of viewers who are currently viewing the live video stream. Conversely, the live-video-stream display 306 includes a view of the live video stream captured by the camera 301 of the broadcaster device 106. Accordingly, the viewer indicator 310 indicates to a broadcaster a number of current viewers and the live-video-stream display 306 includes a view of what the viewers see in the live video stream.

As described above, in some embodiments, the social networking system 102 relays (and a broadcaster device presents) a video clip of a reaction to the live video stream. FIG. 3A illustrates an embodiment of such a video clip presented by the broadcaster device 106. As shown, the live-video-stream GUI 304 includes a video-graphical element 312. The video-graphical element 312 includes a view of a video clip of a reaction by a viewer to the live video stream. In this particular embodiment, the broadcaster device 106 presents the video clip for its entire duration (e.g., four seconds) within the video-graphical element 312 overlaid on the live-video-stream display 306. Additionally, in some embodiments, the broadcaster device 106 repeatedly presents the video clip for its duration (again and again) within the video-graphical element 312 such that the video clip replays after reaching its end.

In addition to receiving and relaying video clips, in some embodiments, the social networking system 102 provides options to disable video clips during a live-video-stream broadcast. For example, the social networking system 102 optionally provides a video-reaction control within the social networking application 108. As shown in FIG. 3A, the live-video-stream GUI 304 also includes a video-reaction control 318. The video-reaction control 318 comprises an interactive graphical element through which a broadcaster may enable or disable viewers generally from recording and/or adding video clips during a particular live-video-stream broadcast.

In some embodiments, the broadcaster device 106 detects user interactions between the broadcaster and the video-reaction control 318 that either enable or disable viewers from recording and/or adding video clips. As shown in FIG. 3A, the video-reaction control 318 indicates that reaction-video elements are generally enabled (e.g., for all viewers or selected viewers). In some embodiments, the video-reaction control 318 appears covered by a graphical element (e.g., an X mark) and, therefore, indicates that reaction-video elements are generally disabled (e.g., for all viewers). The video-reaction control 318, however, comprises merely one example of an option to enable or disable video clips. In addition or in the alternative to a video-reaction control, the social networking system 102 may provide the social networking application 108 with a settings menu or other graphical elements comprising a selectable option to enable or disable video clips during a live-video-stream broadcast.

In addition to relaying video clips, in some embodiments, the social networking system 102 relays comments by viewers concerning a live video stream to a broadcaster. As shown in FIG. 3A, for example, the live-video-stream GUI 304 includes a comment 314. Similar to receiving a video clip during a live-video-stream broadcast, the social networking system 102 may receive and transmit comments from a viewer device to a broadcaster device during a live-video-stream broadcast. The broadcaster device in turn presents the comment within a graphical user interface, such as the broadcaster device 106 presenting the comment 314 within the live-video-stream GUI 304. Accordingly, the social networking system 102 provides tools for a viewer to both comment on and record video clips reacting to a live video stream.

Similar to providing controls for video clips, in some embodiments, the social networking system 102 provides options to enable or disable comments during a live-video-stream broadcast. As shown in FIG. 3A, for example, the live-video-stream GUI 304 includes a comment control 316. The comment control 316 comprises an interactive graphical element by which a broadcaster may enable or disable viewers generally from commenting during a particular live-video-stream broadcast (e.g., by enabling or disabling a comment text box within a graphical user interface of some or all of the social networking applications 116).

In some embodiments, the broadcaster device 106 detects user interactions between the broadcaster and the comment control 316 that either enable or disable viewers from adding comments to the live-video-stream GUI 304. As shown in FIG. 3A, for example, the comment control 316 appears uncovered by any graphical elements. When shown unobscured, the comment control 316 indicates that comments are generally enabled (e.g., for all viewers, selected viewers, friends or followers). In some embodiments, the comment control 316 appears covered by a graphical element (e.g., an X mark or grey overlay). In this alternative embodiment, the obscured comment control 316 indicates that video clips are generally disabled (e.g., for all viewers). The comment control 316, however, comprises merely one example of an option to enable or disable comments. In addition or in the alternative to a comment control, the social networking system 102 may provide the social networking application 108 with a settings menu or other selectable options to enable or disable comments during a live-video-stream broadcast.

Figure 3D:
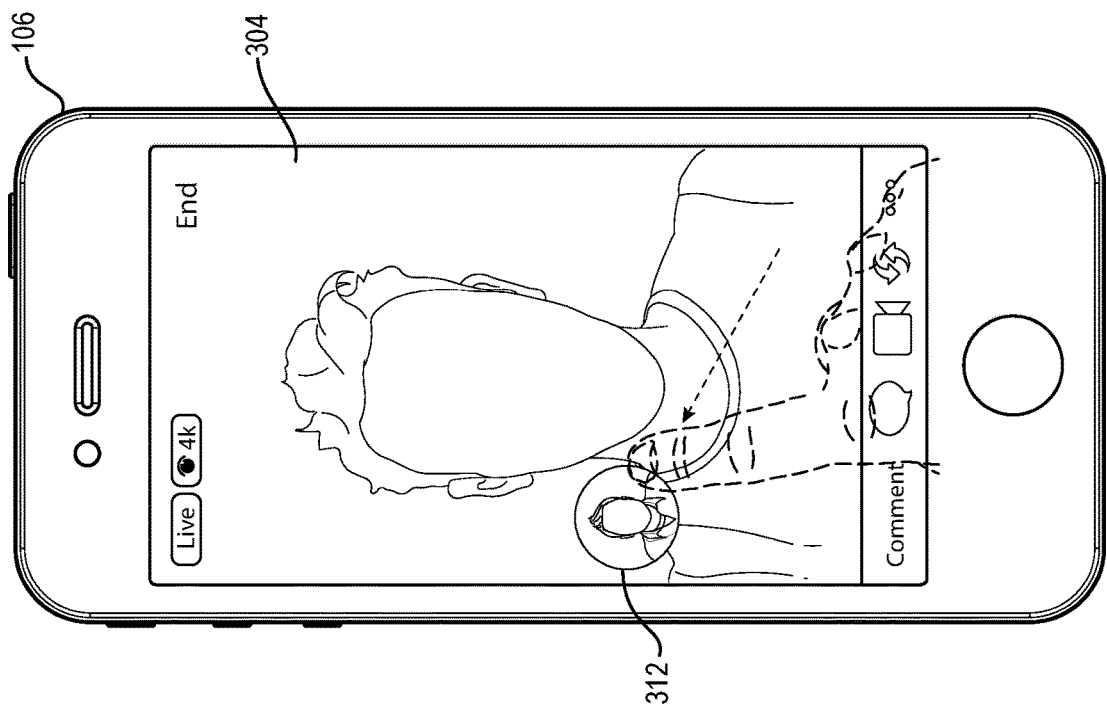
Figure 3C:
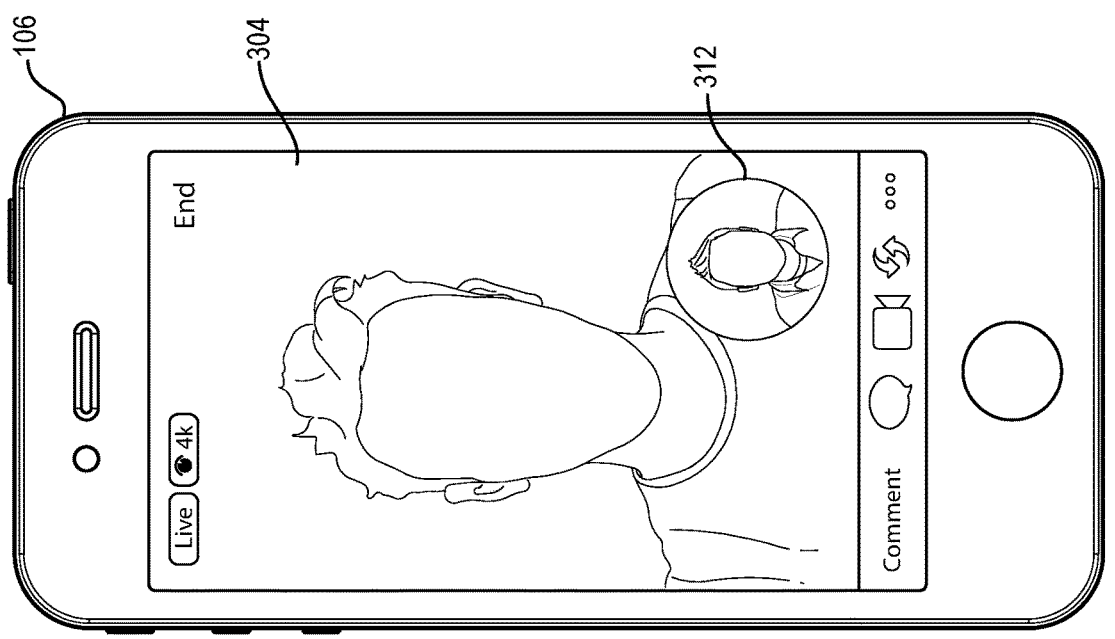

As noted above, FIG. 3A illustrates an example of a video-graphical element. In particular, FIG. 3A illustrates one example of a size of the video-graphical element 312 relative to the live-video-stream GUI 304. In some embodiments, however, the social networking system 102 provides options (e.g., as part of the social networking application 108) to the broadcaster device 106 that enables the broadcaster device 106 to adjust a size of a video-graphical element or to present the video-graphical element in different sizes relative to a graphical user interface. As shown in FIGS. 3B and 3C, for example, the video-graphical element 312 is scalable within the live-video-stream GUI 304.

In FIG. 3B, for instance, the broadcaster device 106 presents the video-graphical element 312 in a given or a default size within the live-video-stream GUI 304. When the broadcaster device 106 detects a user interaction between the broadcaster and the video-graphical element 312—such as a pinch-and-open touch gesture or other touch gesture that indicates enlarging the size of the video-graphical element— the broadcaster device 106 sends an indication of that user interaction to the social networking application 108. Upon receiving the indication, the social networking application 108 enlarges a display of the video-graphical element 312 within the live-video-stream GUI 304. As shown in FIG. 3C, for example, the broadcaster device 106 presents the video-graphical element in a larger size within the live-video-stream GUI 304 than the given or the default size shown in FIG. 3B.

In addition to adjusting the size of a video-graphical element based on a detected user interaction, in some embodiments, the social networking system 102 transmits data to the broadcaster device 106 to control or adjust a size of a video-graphical element. For example, in some embodiments, the social networking system 102 transmits data to the broadcaster device 106 that controls or adjusts the size of a video-graphical element based on various factors. Such factors include, but are not limited to, a number of friends or followers associated with a viewer who captured a corresponding video clip, an affinity coefficient for the viewer (who captured the corresponding video clip) relative to the broadcaster, and/or reactions received from other viewers to the video clip (e.g., comments or reaction elements to the video clip).

In some such embodiments, the more friends or followers associated with a viewer, the larger the size of the corresponding video-graphical element. Similarly, in some embodiments, the larger the affinity coefficient for a viewer, the larger the size of the corresponding video-graphical element. In some instances, the more reactions received in response to a video clip, the larger the size of the corresponding video-graphical element. In some embodiments, however, the social networking system 102 sets a maximum size (relative to a live-video-stream GUI) above which a video-graphical element may not exceed.

In addition to adjusting the size of a video-graphical element based on a detected user interaction or various factors, in some embodiments, the social networking system 102 provides data (e.g., as part of the social networking application 108) to the broadcaster device 106 that enables the broadcaster device 106 to adjust a location of a video-graphical element or to present the video-graphical element in a different location within a graphical user interface. FIG. 3D illustrates one example of the broadcaster device 106 updating a location of the video-graphical element 312 within the live-video-stream GUI 304 in response to detecting a user interaction.

As shown in FIG. 3D, when the broadcaster device 106 detects a user interaction between a broadcaster and the video-graphical element 312—such as a swipe, flick, or other touch gesture that indicates changing a location of the video-graphical element 312—the broadcaster device 106 sends an indication of that user interaction to the social networking application 108. Upon receiving the indication to change the location, the social networking application 108 updates a location of the video-graphical element 312 within the live-video-stream GUI 304 according to the location indicated by the user interaction. In this particular example shown in FIG. 3D, the social networking application 108 updates the location of the video-graphical element 312 within the live-video-stream GUI 304 to move toward the left of the live-video-stream GUI 304 in response to the broadcaster device 106 detecting a drag-left touch gesture.

FIG. 3D, however, illustrates merely one example of the social networking application 108 updating the location of the video-graphical element 312. In additional embodiments, the social networking application 108 updates the location of the video-graphical element 312 to any location within the live-video-stream GUI 304 according to a detected touch gesture corresponding to the location. Alternatively, the social networking application 108 updates a location of a video-graphical element within a graphical user interaction according to other forms of user interactions, including a mouse click, a mouse drag, a stylus interaction, or a keyboard input.

Figure 3F:
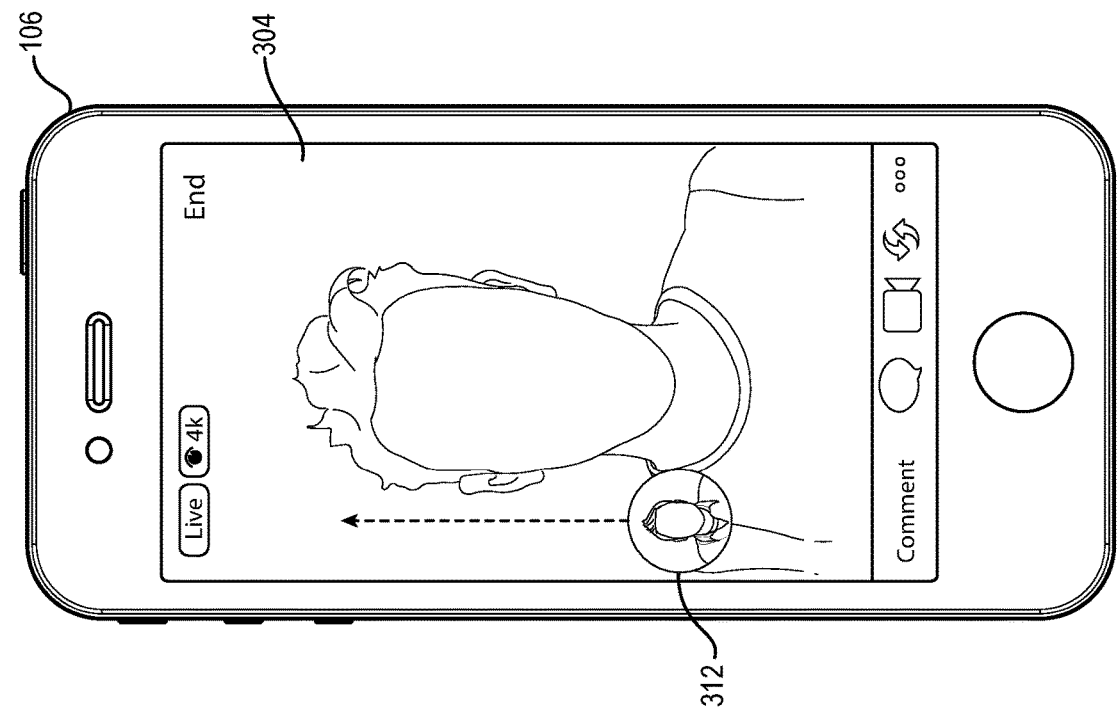
Figure 3E:
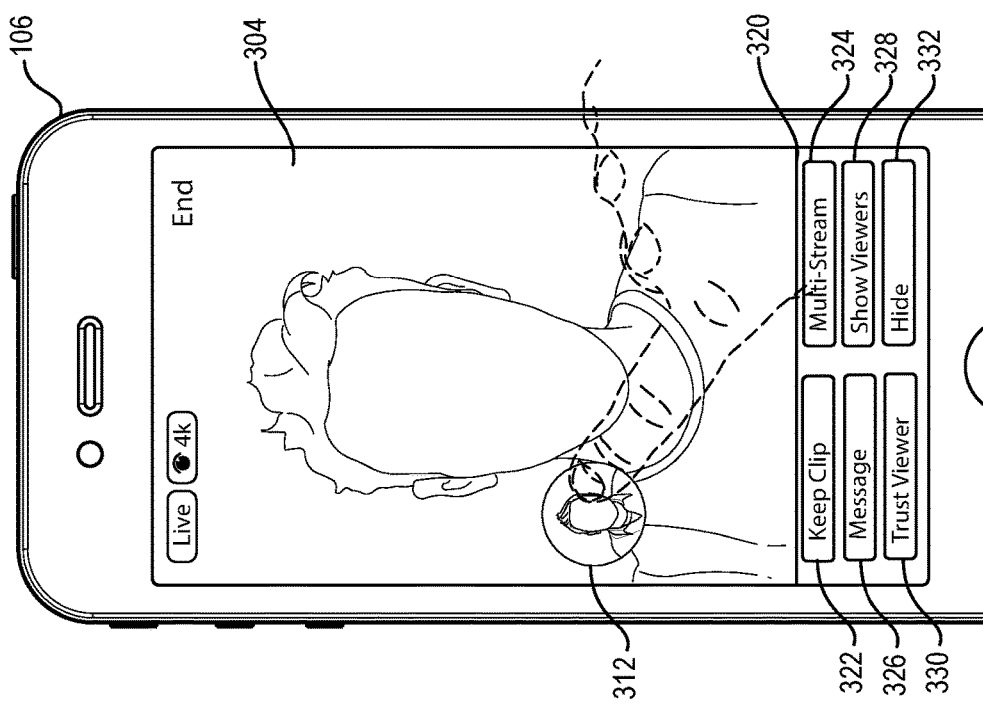

In addition to adjusting a size or location of a video-graphical element, the social networking system 102 optionally provides within the social networking application 108 options or functions that initiate a grant or denial of permissions to viewers or that initiate interaction between a broadcaster and a viewer. In some embodiments, for instance, the social networking system 102 provides options (e.g., within the social networking application 108) related to permissions or communications based on user interactions with a video-graphical element. FIG. 3E illustrates an example of the broadcaster device 106 detecting a user interaction with the video-graphical element 312 that triggers generation of such interactive options.

As shown in FIG. 3E, the broadcaster device 106 presents an interactive menu 320 (within the live-video-stream GUI 304) that includes various options for a broadcaster to interact with (and control permissions for) a viewer who captured the video clip within the video-graphical element 312. When the broadcaster device 106 detects a certain user interaction between a broadcaster and the video-graphical element 312—such as a double tap or other touch gesture that indicates a request to engage with the video-graphical element 312—the broadcaster device 106 sends an indication of that user interaction to the social networking application 108. In response to receiving an indication of the user interaction, the social networking application 108 causes the broadcaster device 106 to present the interactive menu 320. As shown in FIG. 3E, the interactive menu 320 includes various interactive options, including a maintain-video-clip option 322, a multi-stream option 324, a message option 326, a show-viewers option 328, a trust-viewer option 330, and a hide option 332.

As suggested above, when the broadcaster device 106 detects a selection by the broadcaster of one of the interactive options 322-332, the social networking application 108 provides a grant of permission, denial of permission, or communication corresponding to each option. For example, when the maintain-video-clip option 322 is selected, the social networking application 108 maintains a display of the video-graphical element 312 (e.g., by maintaining a display of the video-graphical element 312 within the live-stream-video GUI 304 and/or maintaining a display of the video-graphical element 312 as an overlay of the live video stream shown to viewers). When the multi-stream option 324 is selected, the social networking application 108 initiates a multi-user-live-video stream that includes multiple users as broadcasters (e.g., by adding a live-video stream from the viewer who captured the video clip to the live-video stream of the broadcaster within a live-video-stream display). In some such embodiments, the social networking application 108 causes the broadcaster device 106 to send a digital invitation (through the social networking system 102) to a viewer device (e.g., viewer device 114a), where the digital invitation includes a request to join the live-video stream as a broadcaster.

In addition to options that control the visual presentation of the live-video stream, the interactive menu 320 includes options for interacting directly with the viewer who captured the video clip within the video-graphical element 312. When the message option 326 is selected, for instance, the social networking application 108 initiates an instant message, private message, or direct message for the broadcaster device 106 to send to the viewer who captured the video clip within the video-graphical element 312. For example, in some embodiments, the social networking application 108 causes the broadcaster device 106 to present a text box in which the broadcaster may input a message for the viewer and an additional option to send the message to the viewer who captured the video clip within the video-graphical element 312. Upon receiving an inputted text and a selection to of the additional option to send the message, the social networking application 108 directs the broadcaster device 106 to send the message.

The interactive menu 320 further includes options that control permissions for a video-graphical element to appear with the live-video stream for viewers. For example, when the show-viewers option 328 is selected, the broadcast device 300 directs the social networking system 102 to add the video-graphical element 312 to the live video stream transmitted to various viewer devices (e.g., viewer devices 114a-114n). In some embodiments, the show-viewers option 328 adds the video-graphical element 312 to the live video stream transmitted to all viewer devices or, alternatively, to only those viewer devices corresponding to viewers who have previously been granted permission to view video clips. Similarly, when the trust-viewer option 330 is selected, the social networking application 108 directs the social networking system 102 to permit the viewer who captured the video-graphical element 312 to add video clips to future live-video streams from the broadcaster. In some embodiments, for example, the trust-viewer option 330 permits the viewer who captured the video-graphical element 312 to add video clips to future live video streams transmitted to all viewer devices or, alternatively, to future live video streams transmitted to viewer devices corresponding to viewers who have previously been granted permission to view video clips.

Conversely, when the hide option 332 is selected, the social networking application 108 directs the social networking system 102 to remove the video-graphical element 312 from the live video stream transmitted to various viewer devices (e.g., viewer devices 114a-114n). For instance, in some embodiments, the hide option 332 triggers the social networking application 108 to remove the video-graphical element 312 from the live video stream transmitted to all viewer devices or, alternatively, from the live video stream transmitted to viewer devices corresponding to viewers who have previously been denied permission to view video clips.

In addition to the options shown in FIG. 3E, the social networking system 102 sometimes provides additional options, such as options that—when selected by the broadcaster—cause the social networking application 108 to remove a viewer from viewing the live video stream, provide a text box in which a broadcaster may input a comment in response to the video clip within the video-graphical element 312, or provide a list of reaction options from which the broadcaster may select to react to the video clip within the video-graphical element 312 (e.g., a thumbs up, beating heart, laughing face, surprised face, crying face, angry face, or other reaction element).

In addition to providing options to interact with or change a location of a video-graphical element, in some embodiments, the social networking system 102 provides data (e.g., as part of the social networking application 108) that directs the social networking application 108 to change a location of a video-graphical element and/or remove a video-graphical element from a graphical user interface (e.g., without user interaction corresponding to the movement). As shown in FIG. 3F, for instance, the broadcaster device 106 presents the video-graphical element 312 within the live-video-stream GUI 304 as the social networking application 108 updates the location of the video-graphical element 312 to move across the live-video-stream GUI 304.

In some embodiments, such as that shown in FIG. 3F, the social networking application 108 updates the location of the video-graphical element 312 to continuously move across the live-video-stream GUI 304 and toward an edge of the live-video-stream GUI 304—without detecting any user interaction or input from the broadcaster that specifically controls the continuous movement. In this particular embodiment, rather than detecting a user interaction or input that controls movement, the broadcaster device 106 detects a termination of a user interaction with the video-graphical element 312, such as a release or termination of a swipe, flick, double tap, or a termination of another touch gesture that moves or selects the video-graphical element 312. Upon detecting a termination of the user interaction, the social networking application 108 updates the live-video-stream GUI 304 to return the video-graphical element 312 to a previous location or to continuously move across the live-video-stream GUI 304 while the broadcaster device 106 presents the video clip within the video-graphical element 312. As shown in FIG. 3F, for instance, after detecting a termination of a touch gesture, the broadcaster device 106 sends an indication of the detected termination to the social networking application 108. The social networking application 108 then updates the live-video-stream GUI 304 to continuously move the video-graphical element 312 toward a top of the live-video-stream GUI 304 in a floating pattern.

Beyond changing a location of or removing a video-graphical element, in some embodiments, the social networking application 108 provides data (e.g., as part of the social networking application 108) that directs the social networking application 108 to maintain a location of a video-graphical element in response to a user interaction. For example, in some instances, the broadcaster device 106 detects a user interaction with the video-graphical element 312, such as a tap or other touch gesture that indicates maintaining a location of a video-graphical element. Upon detecting the user interaction, the social networking application 108 updates the live-video-stream GUI 304 to maintain the video-graphical element 312 at a current location within the live-video-stream GUI 304—while the broadcaster device 106 presents the video clip within the video-graphical element 312. In some instances, the detected user interaction indicates a directive to stop a motion of the video-graphical element 312 across the live-video-stream GUI 304. As shown in FIG. 3F, for example, a detected tap of the video-graphical element 312 would indicate to the social networking application 108 to stop the video-graphical element 312 from moving across (e.g., upward, sideways) the live-video-stream GUI 304.

In addition to facilitating independent movement of the video-graphical element 312, in some embodiments, the social networking system 102 provides data (e.g., as part of the social networking application 108) that controls a movement of the video-graphical element 312 to correspond with a duration time of a video clip. For example, in some embodiments, the social networking application 108 continuously moves the video-graphical element 312 from one location to another location within the live-video-stream GUI 304 (e.g., from the bottom to the top of the live-video-stream GUI 304). Upon arriving at a terminal location (e.g., a top or an edge of the live-video-stream GUI 304), the social networking application 108 updates the live-video-stream GUI 304 to remove the video-graphical element 312. For example, in some embodiments, the social networking application 108 continuously moves the video-graphical element 312 in a floating fashion from a bottom to a top of the live-video-stream GUI 304 until the video-graphical element 312 gradually disappears from the live-video-stream GUI 304.

Figure 3H:
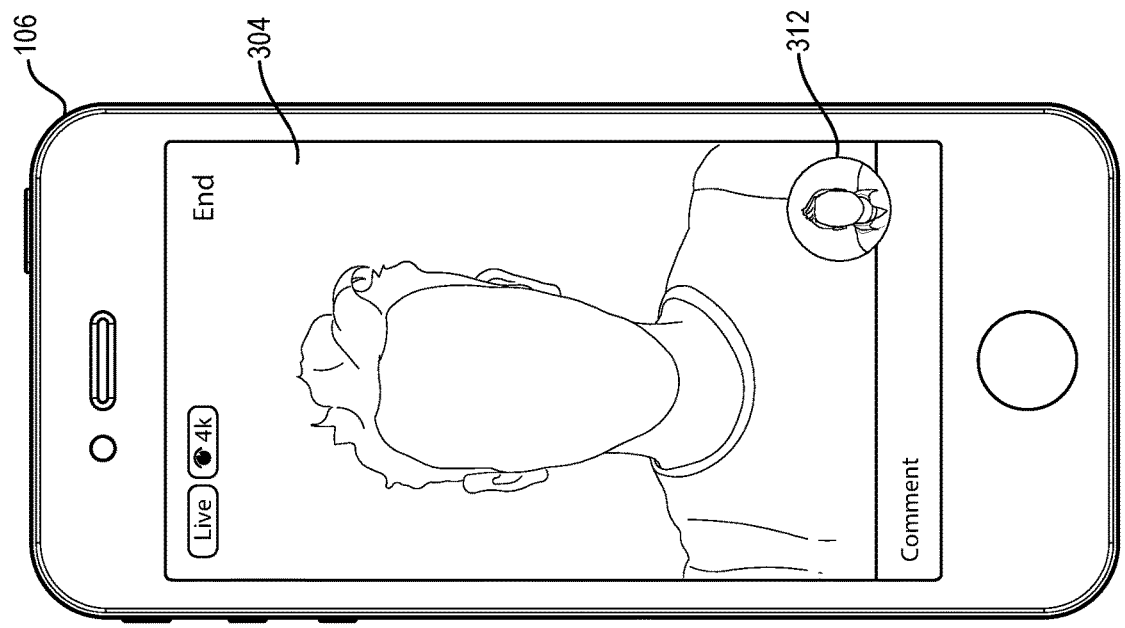
Figure 3G:
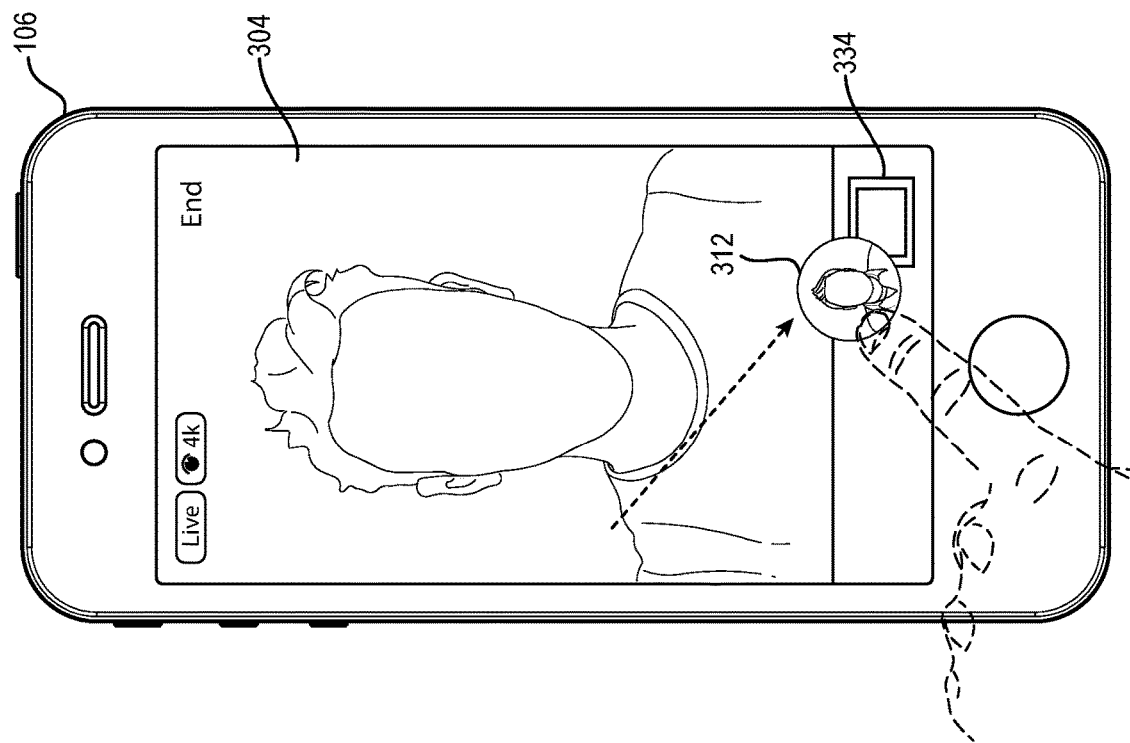

In addition to the user interactions described above that, for example, trigger an interactive menu, in some embodiments, the social networking system 102 provides options that do not correspond to an interactive menu but are nevertheless based on user interaction. Indeed, in some embodiments, any of the functions or options described above correspond to a user interaction without an interactive menu (e.g., a touch gesture or mouse click). FIGS. 3G-3H illustrate an embodiment of one such option that a user interaction triggers without an interactive menu.

As shown in FIGS. 3G-3H, the social networking application 108 maintains a display of the video-graphical element 312. Specifically, and as shown in FIG. 3G, when the broadcaster device 106 detects a user interaction between a broadcaster and the video-graphical element 312—such as a dragging the video-graphical element 312 to a digital video frame 334 or other touch gesture—the broadcaster device 106 sends an indication of the user interaction to the social networking application 108. As shown in FIG. 3H, in response to receiving an indication of the user interaction, the social networking application 108 maintains a display of the video-graphical element 312 during a live-video-stream broadcast. For example, the social networking application 108 maintains a display of the video-graphical element in the lower-right-hand corner of the live-video-stream GUI 304 overlaid on the live-video-stream display 306.

While FIGS. 3A-3H illustrate embodiments of the social networking system 102 from the perspective of the broadcaster device 106, the social networking system 102 likewise includes embodiments in which a viewer device (e.g., the viewer device 114a) performs some of the functions performed by the broadcaster device 106 illustrated by FIGS. 3A-3H. For example, in some embodiments and consistent with the disclosure above, the viewer device 114a (in combination with the social networking application 116a) present a live video stream, present a video clip of a viewer's reaction to the live video stream within a video-graphical element, detect user interactions that trigger adjusting a size or location of the video-graphical element based on a user interaction or various factors, maintain a display of the video-graphical element, remove a display of the video-graphical element (from the viewer device's graphical user interface only), or comment in response to the video clip within the video-graphical element 312.

As noted above, in some embodiments, a viewer device presents a live video stream and records a video clip of a reaction to the live video stream by a viewer. FIGS. 4A-4F illustrate certain embodiments of the social networking system 102 in which a viewer device performs various features and functions related to the capture and presentation of the video clip. While this disclosure refers to touch gestures or mouse clicks as examples of user interactions when describing FIGS. 4A-4F, in additional or alternative embodiments, the broadcaster device 106 detects any suitable user interaction, including a stylus interaction or a keyboard input.

As shown in FIG. 4A, an example of the viewer device 114a includes a touch screen display 404 that facilitates presentation of a live video stream. For instance, after receiving a live video stream that originates from a broadcaster device and detecting a viewer's selection of an option to view the live video stream, the viewer device 114a presents the live video stream within a live-video-stream GUI 406 via the touch screen display 404. As shown within the live-video-stream GUI 406, a live-video-stream display 414 includes a view of the live video stream that originated from the broadcaster device.

In one or more embodiments, the live-video-stream GUI 406 includes a broadcaster indicator 407, a live indicator 408, and a viewer indicator 410. The broadcaster indicator 407 indicates an identity of the broadcaster corresponding to the broadcaster device transmitting the live video stream. The live indicator 408 indicates to the viewer that the social networking system 102 is currently broadcasting a live video captured by a broadcaster device. Relatedly, the viewer indicator 410 indicates a number of viewers who are currently viewing the live video stream.

As also shown in FIG. 4A, the live-video-stream GUI 406 further includes an exit-stream option 412. The exit-stream option 412 comprises a selectable option that—when selected by the viewer—causes the social networking application 116a to exit a full-screen view of the live video stream. For example, when the social networking application 116a receives an indication from the viewer device 114a of a selection of the exit-stream option 412 by the viewer, the social networking application 116a exits a full-screen view of the live video stream and minimizes the live-video-stream GUI 406 or the live-video-stream display 414. Alternatively, in some embodiments, the exit-stream option 412—when selected by the viewer—causes the social networking application 116a to stop presenting the live video stream (e.g., by hiding or removing the live-video-stream GUI 406 or the live-video-stream display 414 from the touch screen display 404).

In addition to streaming indicators and options, in some embodiments, the social networking system 102 activates a reaction-video element on a viewer device (e.g., for all viewer devices or a selection of viewer devices). As shown in FIG. 4A, the live-video-stream GUI 406 includes a reaction-video element 416. The reaction-video element 416 comprises a selectable option for capturing a video clip of a reaction to a live video stream. Consistent with the disclosure above, in some embodiments, the viewer device 114a receives a signal from the social networking system 102 that activates the reaction-video element 416. Based on receiving the signal, the social networking application 116a causes the viewer device 114a to present the reaction-video element 416. Alternatively, in some embodiments, based on receiving the signal, the social networking application 116a activates the reaction-video element 416 (already presented within the live-video-stream GUI 406) to respond to user interactions.

As further shown in FIG. 4A, the viewer device 114a detects a selection of (or user interaction with) the reaction-video element 416. In some embodiments, the selection or user interaction include a tap of the reaction-video element 416 or other touch gesture (e.g., a long press or press-and-hold gesture) corresponding to the reaction-video element 416. Upon detecting the selection or user interaction, the social networking application 116a causes a camera 402 of the viewer device 114a to begin capturing a video clip of a reaction to the live video stream—while the viewer device 114a presents the live video stream.

As shown in FIG. 4B, the viewer device 114a presents the video clip within a video-graphical element 418 while the camera 402 records the video clip of the reaction to the live video stream. In this embodiment, the camera 402 continues to record the reaction to the live video stream until the viewer device 114a detects a termination of the selection of (or user interaction with) the reaction-video element 416 or until the social networking application 116a causes the camera 402 to stop recording (e.g., after a maximum duration).

As further shown in FIG. 4B, the video-graphical element 418 includes both a view of the video clip and a time-expiration indicator 420. The time-expiration indicator 420 comprises a visual signal of a recording's progress toward a maximum duration for the video clip (e.g., four seconds, ten seconds, twenty seconds). Specifically, the social networking application 116a causes the time-expiration indicator 420 to move clockwise from a top of the video-graphical element 418, around the border of the video-graphical element 418, back to the top of the video-graphical element 418—all within the video-graphical element 418. The recording of the video clip reaches the maximum duration upon moving back to the top of the video-graphical element 418. If, however, the social networking application 116a receives an indication from the viewer device 114a of a termination of the selection of (or user interaction with) the video-graphical element 418, the social networking application 116a causes the camera 402 to stop recording the video clip.

FIGS. 4A-4B illustrate merely one example of the viewer device 114a recording a video clip of a reaction to the live video stream. In other embodiments, the viewer device 114a records a video clip based on detecting a selection of (or user interaction with) a physical button of the viewer device 114a or a different graphical element within the live-video-stream GUI 406. Additionally, in some embodiments, the video-graphical element 418 does not include the time-expiration indicator 420.

Figure 4D:
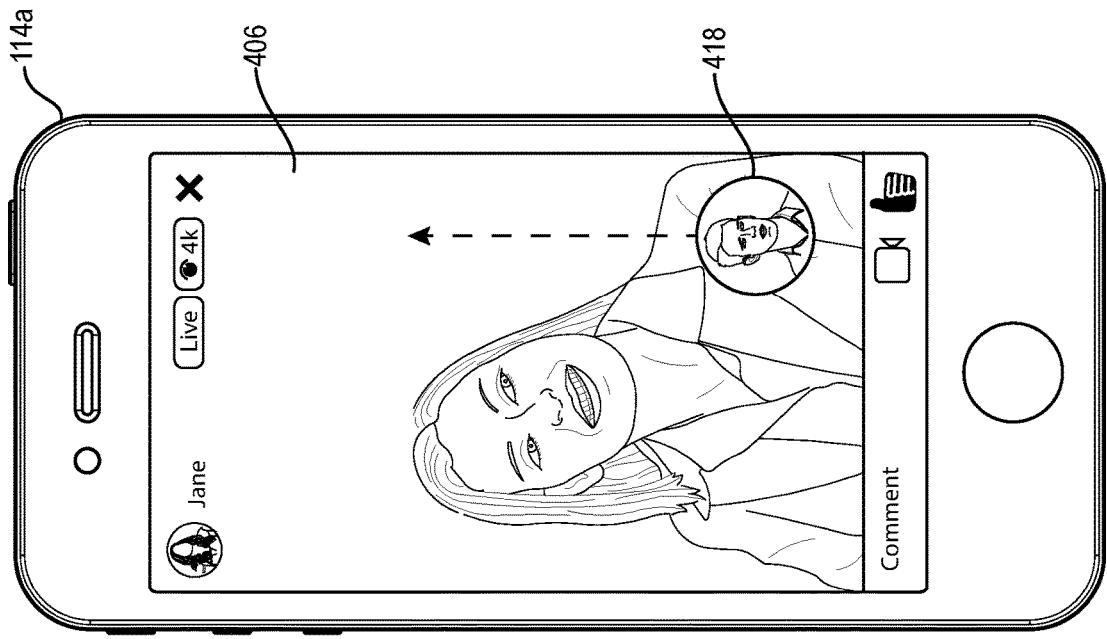
Figure 4C:
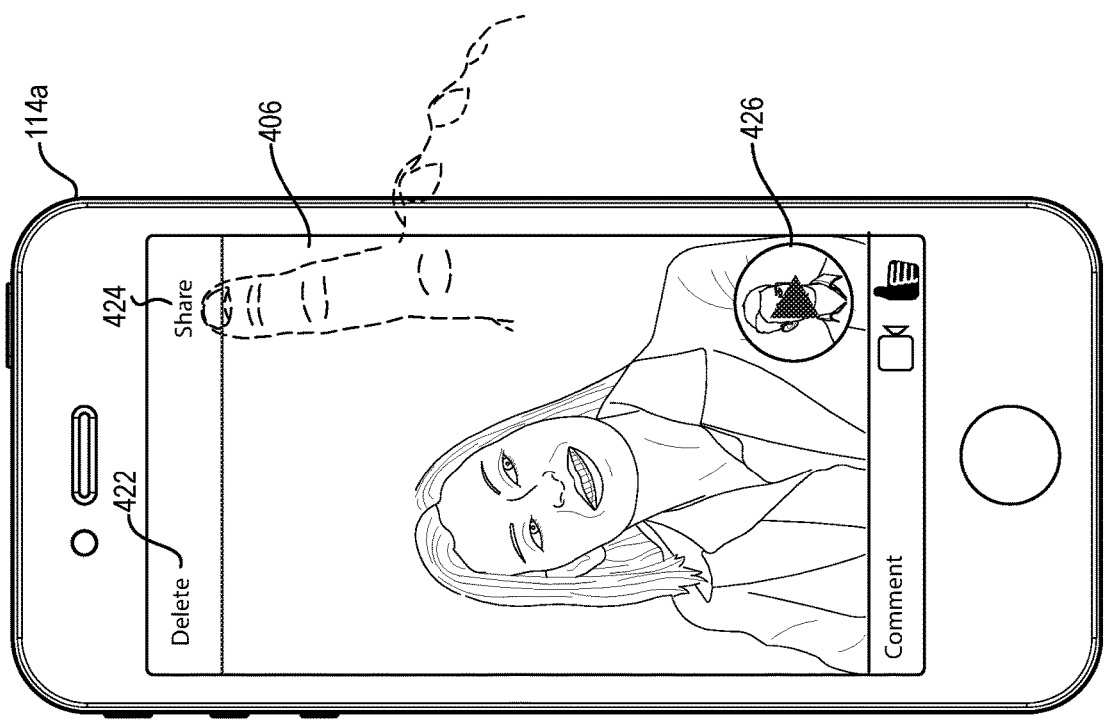

In addition to facilitating a recording of a video clip, in some embodiments, the social networking application 116a facilitates providing a preview of the video clip (e.g., by providing a social networking application with a preview function). As shown in FIG. 4C, the social networking application 116a causes the viewer device 114a to present a preview 426 of the video clip within the live-video-stream GUI 406. By providing the preview 426, the social networking application 116a allows a viewer to view the video clip in advance of transmitting the video clip to the broadcaster or to other viewers. Specifically, when the viewer device 114a detects a selection of (or user interaction with) the preview 426, the social networking application 116a receives an indication of the selection (or user interaction) from the viewer device 114a and causes the viewer device 114a to play the preview 426.

In addition to facilitating a preview, the social networking application 116a also includes options to delete or send a video clip to a broadcaster or other viewers. As also shown in FIG. 4C, the viewer device 114a presents a delete option 422 and a share option 424 within the live-video-stream GUI 406. Upon detecting a selection of (or user interaction with) the delete option 422, the viewer device 114a sends an indication of the selection (or user interaction) to the social networking application 116a. In response to receiving the indication, the social networking application 116a causes the viewer device 114a to delete the video clip.

Conversely, upon detecting a selection of (or user interaction with) the share option 424, the viewer device 114a sends an indication of the selection (or user interaction) to the social networking application 116a. In response to receiving the indication, the social networking application 116a causes the viewer device 114a to transmit the video clip to the social networking system 102 for subsequent transmission to a broadcaster device and/or other viewer devices (e.g., viewer devices 114b-114n). In this particular embodiment, the viewer device 114a transmits the video clip while the viewer device 114a presents the live video stream.

Similar to a broadcaster device, in some embodiments, a viewer device presents a transmitted video clip within a graphical user interface, including a viewer device associated with the viewer who captured the video clip. As shown in FIG. 4D, for example, the viewer device 114a presents the video-graphical element 418 within the live-video-stream GUI 406 after transmitting the video clip to the social networking system 102. Similar to the video-graphical element 312 shown in FIG. 3F, the video-graphical element 418 shown in FIG. 4D continuously moves across the live-video-stream GUI 406. Specifically, the social networking application 116a updates the location of the video-graphical element 418 to continuously move across the live-video-stream GUI 406 and toward an edge of the live-video-stream GUI 406—without detecting any user interaction or input from the viewer that specifically controls the continuous movement.

In the embodiment shown in FIG. 4D, the viewer device 114a detects a termination of a user interaction with the video-graphical element 418, such as a release or termination of a swipe, flick, double tap, or a termination of another touch gesture that moves or selects the video-graphical element 418. Upon detecting the termination of the user interaction, the social networking application 114a updates the live-video-stream GUI 406 to return the video-graphical element 418 to a previous location or to continuously move across the live-video-stream GUI 406—while the viewer device 114a presents the video clip within the video-graphical element 418.

In addition to transmitting a single video clip, in some embodiments, the social networking system 102 receives multiple video clips from multiple viewer devices. Depending on permissions received, a threshold number of viewers, or other factors, the social networking system 102 optionally transmits multiple video clips to a broadcaster device and multiple viewer devices. Upon receiving the transmission, in some embodiments, the broadcaster device and the multiple viewer devices present the multiple video clips within their respective graphical user interfaces.

Figure 4F:
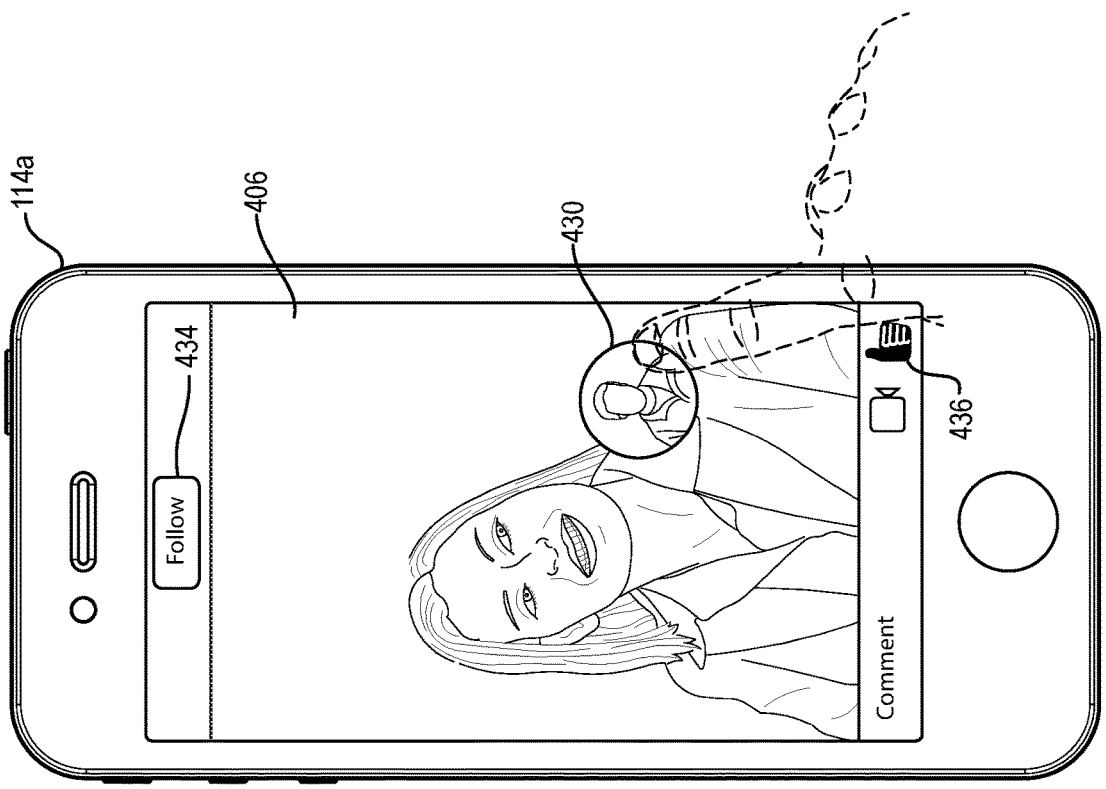
Figure 4E:
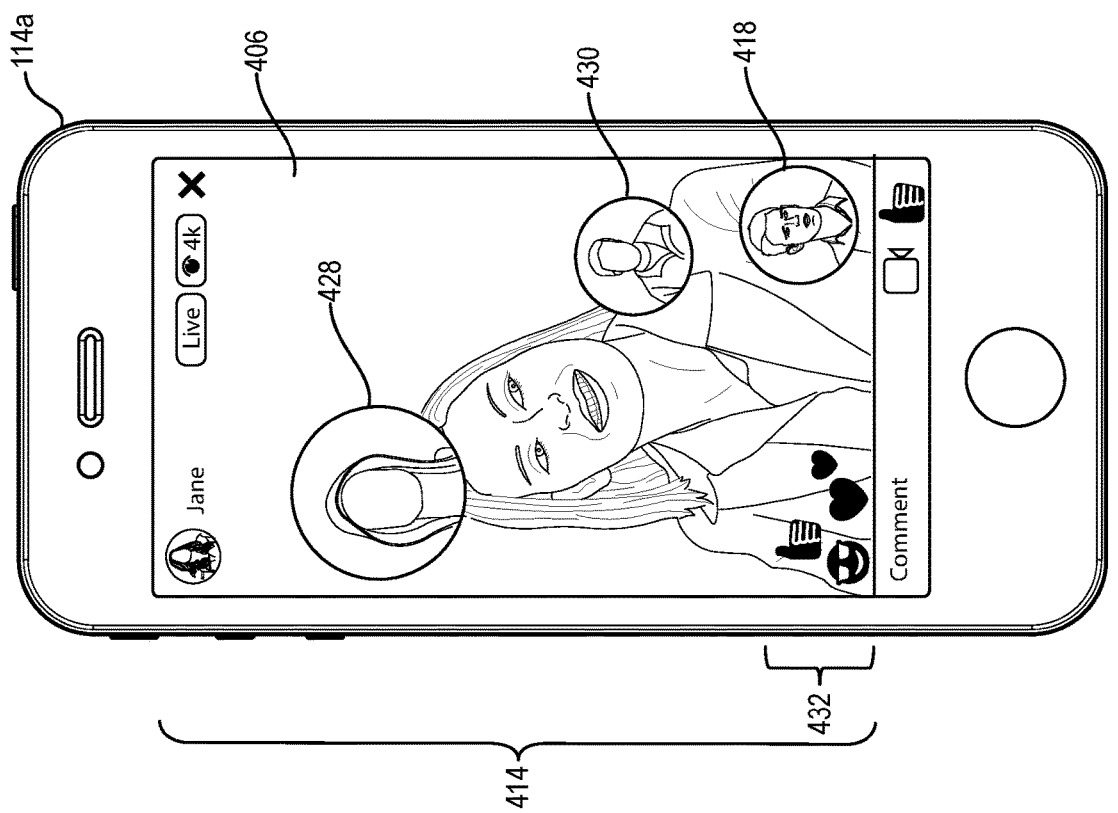

As shown in FIG. 4E, for example, the viewer device 114a receives and presents multiple video clips in addition to presenting the video clip captured by the viewer associated with the viewer device 114a. Specifically, the viewer device 114a presents video-graphical elements 418, 428, and 430 within the live-video-stream GUI 406—while simultaneously presenting the live video stream. Each of the video-graphical elements 418, 428, and 430 include a video clip created by a viewer using different viewer devices. As explained above, the viewer associated with the viewer device 114a, for example, captured the video clip within the video-graphical element 418 using the camera 402. By contrast, the viewers associated with the viewer devices 114b and 114n respectively captured the video clips within the video-graphical elements 428 and 430 using cameras of the viewer devices 114a and 114n. Each of the viewer devices 114a, 114b, and 114n transmit their respective video clips to the social networking system 102, which in turn transmits the video clips to the broadcaster device 106 and other viewer devices.

In addition to presenting multiple video-graphical elements, the viewer device 114a presents each of the video-graphical elements 418, 428, and 430 in different sizes and in different locations within the live-video-stream GUI 406. The video-graphical element 428, for example, is larger than video-graphical elements 418 and 430. Consistent with the disclosure above, the viewer device 114a (in combination with the social networking application 116a) adjusts a size or location of the video-graphical elements 418, 428, and 430 based on a user interaction or various factors. For example, in some embodiments, the social networking system 102 transmits data to the viewer device 114a that controls or adjusts the size of a video-graphical element based on a number of friends or followers (or potential influence) associated with a viewer who captured a corresponding video clip, an affinity coefficient for the viewer (who captured the corresponding video clip) relative to the broadcaster, and/or reactions received from other viewers to the video clip (e.g., comments or reaction elements to the video clip).

As shown in FIG. 4E, for example, the viewer device 114a presents the video-graphical element 428 in a larger size than the video-graphical elements 418 and 430 to reflect a relationship with the broadcaster. Specifically, the viewer who captured the video clip within the video-graphical element 428 has a higher affinity coefficient relative to the broadcaster than the viewers who captured the video clips within the video-graphical elements 418 and 430. Accordingly, in the embodiment shown within FIG. 4E, the sizes of the video-graphical elements 418, 428, and 430 reflect the affinity coefficients of the viewers who captured each corresponding video clip relative to the broadcaster of the live video stream.

In additional or alternative embodiments, the sizes of the video-graphical elements 418, 428, and 430 reflect a number of friends or followers associated with the viewers who captured each corresponding video clip or the reactions received in response to each video clip within the video-graphical elements 418, 428, and 430. Moreover, in some embodiments, the social networking system 102 sets a maximum or minimum size (relative to a live-video-stream GUI) above or below which a video-graphical element may not exceed or fall below. As shown in FIG. 4E, the viewer device 114a presents the video-graphical element 428 in a maximum size and the video-graphical elements 418 and 430 in a minimum size set by the social networking system 102.

In addition to transmitting multiple video-graphical elements in varying sizes, in one or more embodiments, the social networking system 102 receives and transmits reactions by viewers to the live video stream to a broadcaster device and/or viewer devices. In some such embodiments, the social networking system 102 transmits reactions to the live video stream to be presented by a broadcaster device or a viewer device with a video clip within a graphical user interface.

As shown in FIG. 4E, the viewer device 114a receives (from the social networking system 102) and presents a reaction stream 432 overlaid on the live-video-stream display 414. For example, the reaction stream 432 includes reaction elements (e.g., hearts, thumbs up, smiley face) that appear to float across (e.g., from left to right) the live-video-stream display 414 to indicate the types of reactions viewers are having to the live video stream. In such embodiments, the social networking system 102 transmits reactions represented by the reaction stream 432 to increase viewers' engagement with the live video stream. In alternative embodiments, the social networking system 102 transmits the video clips within the video-graphical elements 418, 428, and 430 without the reaction stream 432.

In addition to providing data that enables viewers to interact with a live video stream, in some embodiments, the social networking system 102 provides data (e.g., as part of the social networking application 108 or the social networking application 116a, for example) to a broadcaster device or viewer device that enables a broadcaster or viewer to interact with the viewer who captured a video clip (e.g., by providing options to transmit a follow request, friend request, or reaction to the viewer who captured the video clip). FIG. 4F illustrates an embodiment in which the social networking system 102 activates options within a viewer device for interacting with a viewer who captured the video clip within the video-graphical element 430.

As shown in FIG. 4F, when the viewer device 114a detects a user interaction between a viewer and the video-graphical element 430—such as a double tap or other touch gesture that indicates a request to engage with the video-graphical element 430—the viewer device 114a sends an indication of that user interaction to the social networking application 116a. In response to receiving an indication of the user interaction, the social networking application 116a causes the viewer device 114a to present a follow-request option 434. Upon receiving an indication of a selection of the follow-request option 434, the viewer device 114a transmits a request to follow the viewer who captured the video clip within the video-graphical element 430 (e.g., a request to follow the viewer by receiving posts or notifications of posts by the viewer who captured the video clip).

In addition or in the alternative to the follow-request option 434, in some embodiments, the viewer device 114a presents a friend-request option (not shown) that is triggered by a user interaction with the video-graphical element 430. Upon receiving an indication of a selection of the friend-request option, the viewer device 114a transmits a request to become friends with the viewer who captured the video clip within the video-graphical element 430 (e.g., a request to establish a "friend" relationship within the social networking system 102 that includes access to certain profile information concerning the viewer who captured the video clip). When sending either a follow request or a friend request, the viewer device 114a transmits a follow request or a friend request (through the social networking system 102) to a viewer device associated with the viewer who captured the video clip within the video-graphical element 430.

As further illustrated in FIG. 4F, the live-video-stream GUI 406 includes a reaction control 436. Utilizing the reaction control 436, a viewer associated with the viewer device 114a can submit reactions (e.g., thumbs up, heart) to the video clip within the video-graphical element 430. For example, in at least one embodiment, in response to receiving an indication of a user interaction with the video-graphical element 430—such as a double tap or other touch gesture—the social networking application 116a causes the viewer device 114a to activate the reaction control 436. Upon receiving an indication of the user interaction with the reaction control 436, the viewer device 114a causes the viewer device 114a to present reaction options (e.g., beating heart, thumbs up, sad face, smiley face) from which the viewer may choose as a reaction to the video clip.

Figure 5:
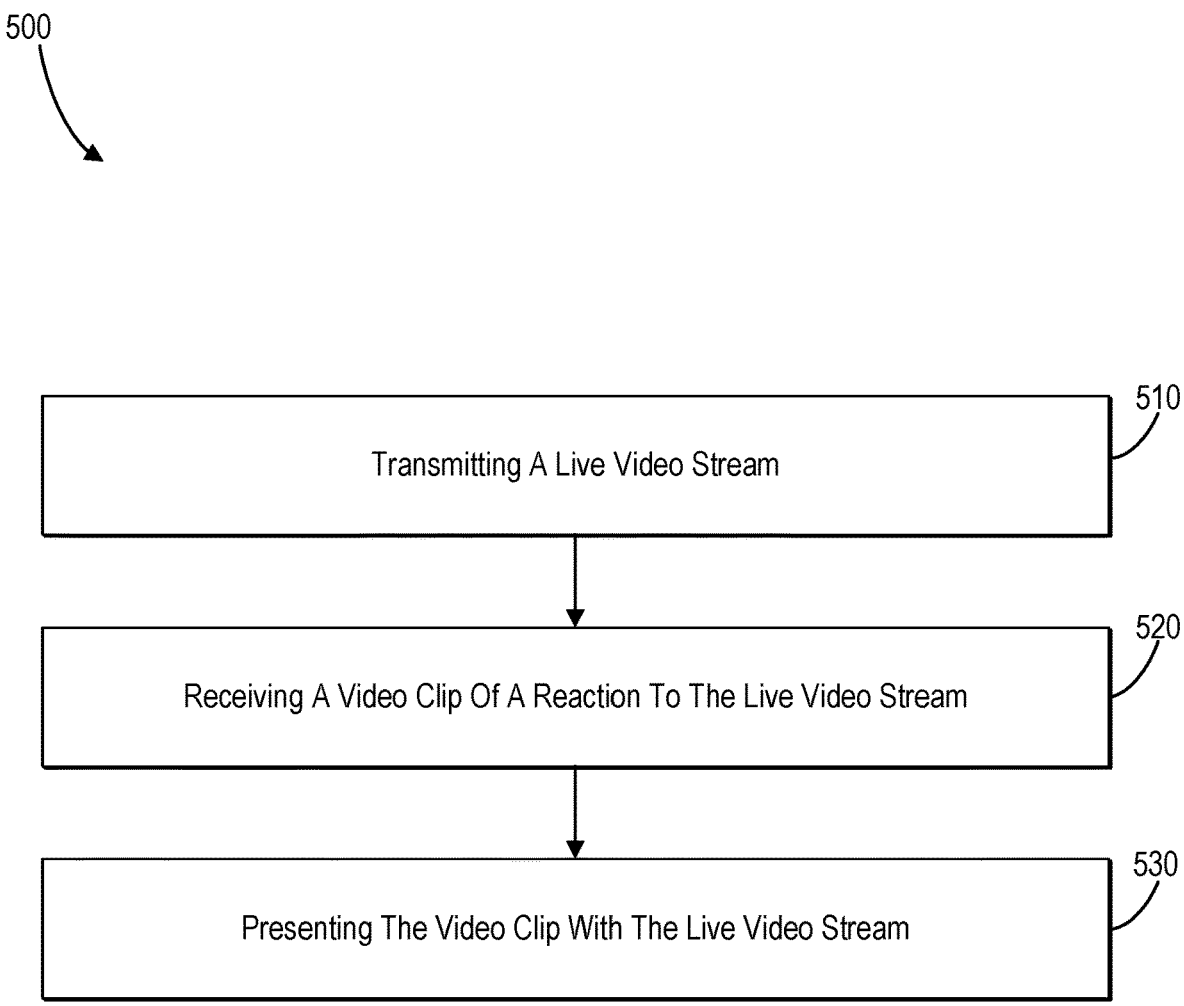
FIG. 5 illustrates a flowchart of a series of acts in a method of presenting a video clip of a reaction to a live video stream in accordance with one or more embodiments.

Turning now to FIG. 5, this figure illustrates a flowchart of a series of acts in a method 500 of presenting a video clip of a reaction to a live video stream in accordance with one or more embodiments of a broadcaster device. While FIG. 5 illustrates acts according to one embodiment, alternative embodiments may omit, add to, reorder, and/or modify any of the acts shown in FIG. 5.

As shown in FIG. 5, the method 500 includes an act 510 of transmitting a live video stream. In particular, the act 510 can include transmitting, by a broadcaster device to a social networking system, a live video stream for broadcast to a plurality of viewers.

As further shown in FIG. 5, the method 500 includes an act 520 of receiving a video clip of a reaction to the live-video stream. In particular, the act 520 can include receiving, by the broadcaster device from the social networking system, a video clip of a reaction to the live video stream by a viewer of the plurality of viewers, the video clip captured by the viewer using a viewer device while the viewer device presents the live video stream. In one or more embodiments, the video clip has a maximum duration. Additionally, in one or more embodiments, presenting the video clip within the graphical user interface comprises presenting the video clip within a graphical element overlaid on the live video stream within the graphical user interface while the broadcaster device captures the live video stream.

As further shown in FIG. 5, the method 500 includes an act 530 of presenting the video clip with the live-video stream. In particular, the act 530 can include presenting, by the broadcaster device, the video clip within a graphical user interface of the broadcaster device with the live video stream while the broadcaster device captures the live video stream.

In addition to the acts 510-530, in one or more embodiments, the method 500 further includes continuously moving, by the broadcaster device, the graphical element across the graphical user interface while presenting the video clip within the graphical element.

Additionally, in some embodiments, the method 500 further includes detecting, by the broadcaster device, a first user interaction with the video clip during presentation of the video clip within the graphical user interface; and in response to the first user interaction: changing a location of the video clip within the graphical user interface; or stopping a motion of the video clip across the graphical user interface. Conversely, in some embodiments, the method 500 further includes detecting, by the broadcaster device, a termination of the first user interaction with the video clip; and in response to the termination of the first user interaction, returning the video clip to a previous location or permitting continued motion of the video clip across the graphical user interface. In some embodiments, the first user interaction comprises a touch gesture with respect to the video clip during the presentation of the video clip within the graphical user interface.

Similarly, in some embodiments, the method 500 further includes detecting, by the broadcaster device, a second user interaction with the video clip; and in response to detecting the second user interaction: adding the viewer to a multi-user-live stream comprising the live video stream from the broadcaster device and an additional live video stream from the viewer device; initiating a communication with the viewer; granting permission for the video clip to be included in the live video stream for the plurality of viewers; granting permission for the viewer to add video clips of reactions to future live video streams from a broadcaster of the live video stream; or denying permission for the video clip to be included in the live video stream for the plurality of viewers.

Figure 6:
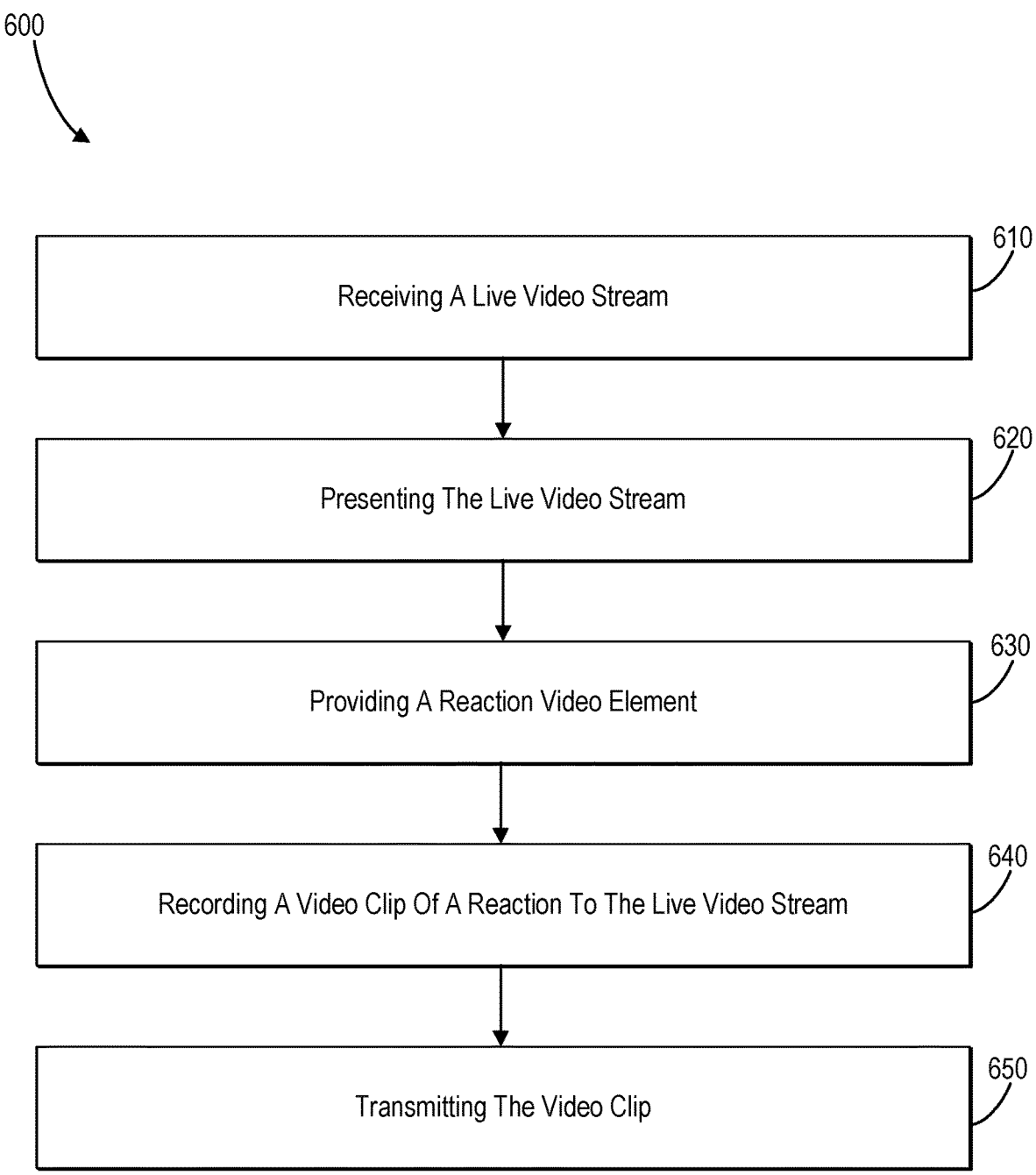
FIG. 6 illustrates a flowchart of a series of acts in a method of transmitting a video clip of a reaction to a live video stream in accordance with one or more embodiments.

Turning now to FIG. 6, this figure illustrates a flowchart of a series of acts in a method 600 of transmitting a video clip of a reaction to a live video stream in accordance with one or more embodiments of a viewer device. While FIG. 6 illustrates acts according to one embodiment, alternative embodiments may omit, add to, reorder, and/or modify any of the acts shown in FIG. 6.

As shown in FIG. 6, the method 600 includes an act 610 of receiving a live video stream. In particular, the act 610 includes receiving, by a viewer device from a social networking system, a live video stream that originates from a broadcaster device.

As further shown in FIG. 6, the method 600 includes an act 620 of presenting the live video stream. In particular, the act 620 includes presenting, by the viewer device, the live video stream within a graphical user interface of the viewer device.

As further shown in FIG. 6, the method 600 includes an act 630 of providing a reaction-video element. In particular, the act 630 includes presenting, by the viewer device within the graphical user interface, a reaction-video element to record video clips of reactions to the live video stream. In one or more embodiments, presenting the reaction-video element to record video clips of reactions to the live video stream is based on receiving a signal from the social networking system that activates the reaction-video element.

As further shown in FIG. 6, the method 600 includes an act 640 of recording a video clip of a reaction to the live video stream. In particular, the act 640 includes, in response to detecting a selection of the reaction-video element, recording, by the viewer device, a video clip of a reaction to the live video stream by a viewer of a plurality of viewers while the viewer device presents the live video stream.

As further shown in FIG. 6, the method 600 includes an act 650 of transmitting the video clip. In particular, the act 650 includes transmitting, by the viewer device to the social networking system, the video clip for transmission to the broadcaster device while the viewer device presents the live video stream.

In addition to the acts 610-650, in one or more embodiments, the method 600 further includes, before transmitting the video clip for transmission to the broadcaster device while the viewer device presents the live video stream, presenting, by the viewer device, a preview of the video clip within the graphical user interface; and in response to detecting an approval of the video clip, transmitting, by the viewer device to the social networking system, the video clip for transmission to the broadcaster device while the viewer device presents the live video stream.

Additionally, in some embodiments, the method 600 further includes receiving, by the viewer device from the social networking system, an additional video clip of an additional reaction to the live video stream by an additional viewer of the plurality of viewers, the additional video clip originating from an additional viewer device; and presenting, by the viewer device, the additional video clip within a graphical element overlaid on the live video stream within the graphical user interface while the viewer device presents the live video stream.

Relatedly, in one or more embodiments, a size of the graphical element is based on one or more of: a number of friends or followers associated with an additional viewer account corresponding to the additional viewer device; an affinity coefficient for the additional viewer account corresponding to the additional viewer device relative to a broadcaster account corresponding to the broadcaster device; or reactions received from one or more of the plurality of viewers to the additional video clip.

Additionally, in one or more embodiments, the method 600 further includes detecting, by the viewer device, a user interaction with the graphical element; and in response to detecting the user interaction: sending a friend request to an additional viewer account corresponding to the additional viewer device; or sending a follow request to the additional viewer account corresponding to the additional viewer device.

Figure 7:
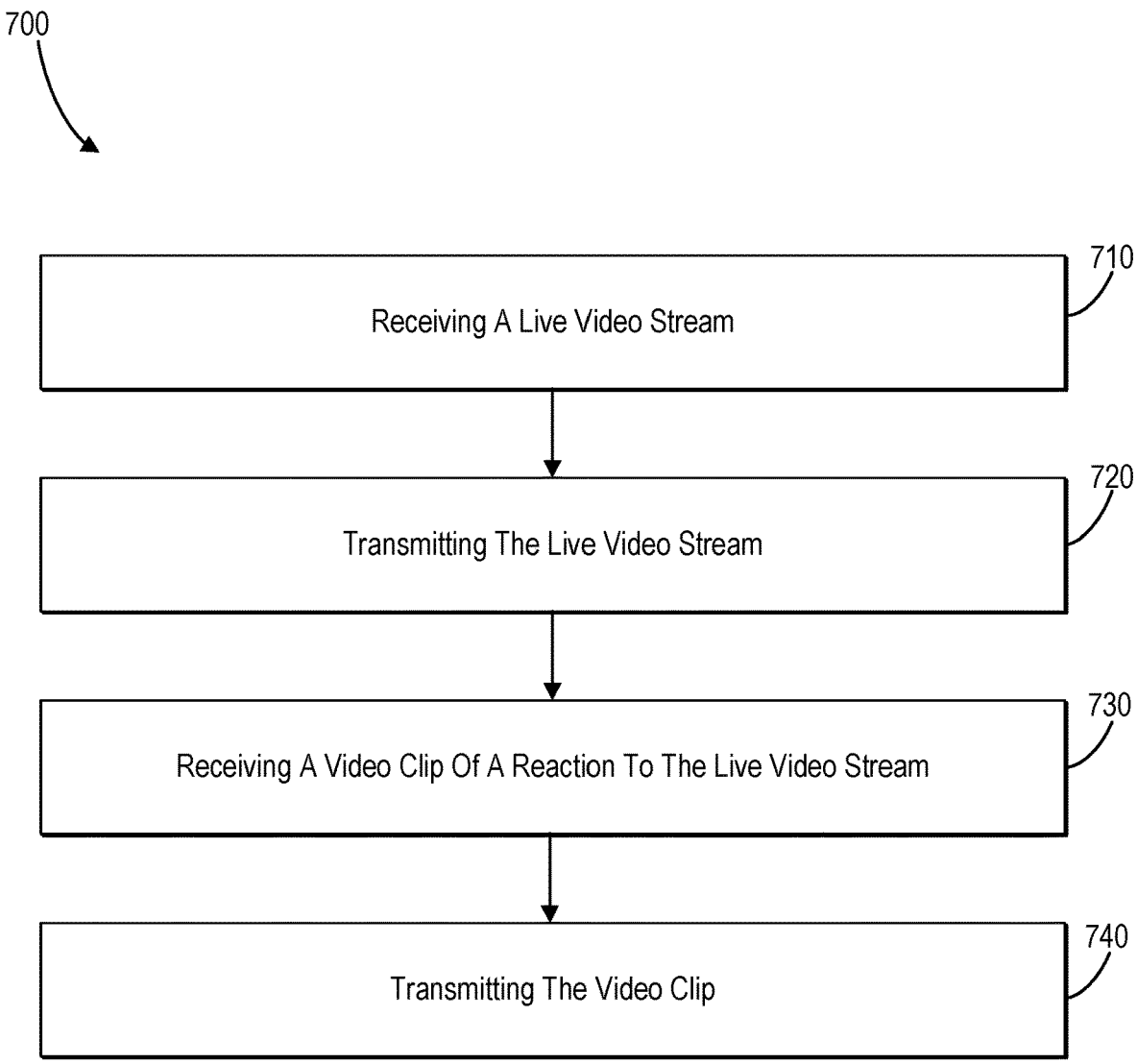
FIG. 7 illustrates a flowchart of a series of acts in a method of transmitting a video clip of a reaction to a live video stream in accordance with one or more embodiments.

Turning now to FIG. 7, this figure illustrates a flowchart of a series of acts in a method 700 of transmitting a video clip of a reaction to a live video stream in accordance with one or more embodiments of a social networking system. While FIG. 7 illustrates acts according to one embodiment, alternative embodiments may omit, add to, reorder, and/or modify any of the acts shown in FIG. 7.

As shown in FIG. 7, the method 700 includes an act 710 of receiving a live stream video. In particular, the act 710 can include receiving, from a broadcaster device, a live video stream for broadcast to a plurality of viewers.

As further shown in FIG. 7, the method 700 includes an act 720 of transmitting the live video stream. In particular, the act 720 can include transmitting, to a plurality of viewer devices for the plurality of viewers, the live video stream received from the broadcaster device.

As further shown in FIG. 7, the method 700 includes an act 730 of receiving a video clip of a reaction to the live video stream. In particular, the act 730 can include receiving, from a viewer device of the plurality of viewer devices, a video clip of a reaction to the live video stream by a viewer of a plurality of viewers, the video clip captured by the viewer device while the viewer device presents the live video stream to the viewer.

As further shown in FIG. 7, the method 700 includes an act 740 of transmitting the video clip. In particular, the act 740 can include transmitting the video clip to the broadcaster device for presentation by the broadcaster device while the system receives the live video stream from the broadcaster device. In one or more embodiments, transmitting the video clip to the broadcaster device for presentation by the broadcaster device while the system receives the live video stream from the broadcaster device comprises transmitting the video clip to the broadcaster device for presentation, by the broadcaster device, within a graphical element overlaid on the live video stream within a graphical user interface of the broadcaster device while the system receives the live video stream from the broadcaster device.

In addition to the acts 710-740, in some embodiments, the method 700 further includes directing the graphical element to continuously move in a floating motion toward an edge of the graphical user interface while the system receives the live video stream from the broadcaster device.

Additionally, in some embodiments, the method 700 further includes activating on the plurality of viewer devices a reaction-video element to capture video clips of reactions to the live video stream. Similarly, in some embodiments, the method 700 further includes selectively activating, on one or more of the plurality of viewer devices, a reaction-video element to capture video clips of reactions to the live video stream.

In some such embodiments, selectively activating, on the one or more of the plurality of viewer devices, the reaction-video element to capture video clips of reactions to the live video stream is based on one or more of: determining that fewer than a threshold number of the plurality of viewers are viewing the live video stream; determining that the one or more of the plurality of viewer devices correspond to viewer accounts of friends or followers of a broadcaster account corresponding to the broadcaster device; determining that the broadcaster account has granted permission for viewer accounts corresponding to the one or more of the plurality of viewer devices to add video clips of reactions to the live video stream for the plurality of viewers; or determining that the one or more of the plurality of viewer devices correspond to viewer accounts with affinity coefficients that exceed a threshold, the affinity coefficients relative to a broadcaster account corresponding to the broadcaster device.

Figure 8:
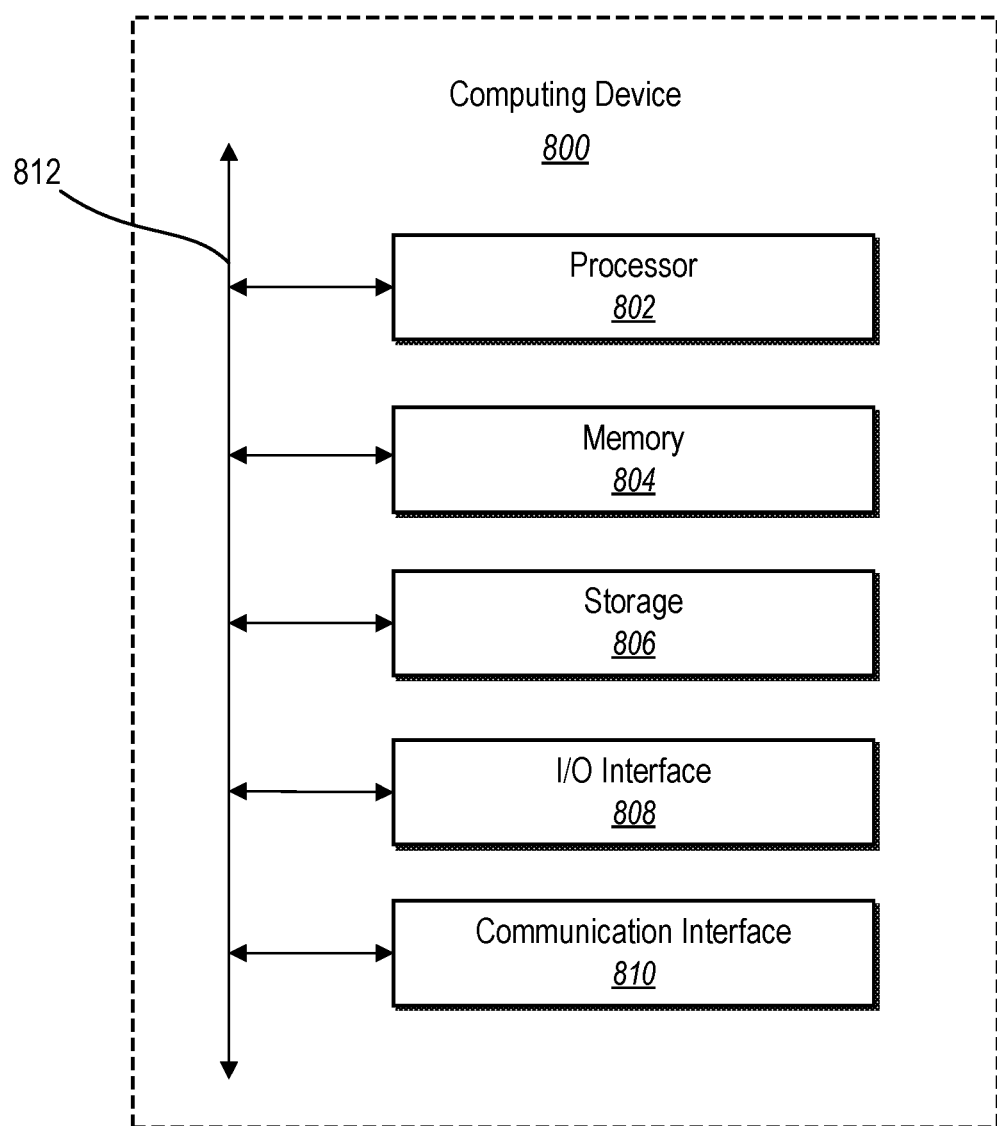
FIG. 8 illustrates a block diagram of an example computing device in accordance with one or more embodiments.

FIG. 8 illustrates a block diagram of exemplary computing device 800 that may be configured to perform one or more of the processes described above. One will appreciate that one or more computing devices such as the computing device 800 may implement the social networking system 102. As shown by FIG. 8, the computing device 800 can comprise a processor 802, a memory 804, a storage device 906, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 906 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers ("TLBs"). Instructions in the instruction caches may be copies of instructions in the memory 804 or the storage device 906.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 906 includes storage for storing data or instructions. As an example and not by way of limitation, storage device 906 can comprise a non-transitory storage medium described above. The storage device 906 may include a hard disk drive ("HDD"), flash memory, an optical disc, a magneto-optical disc, magnetic tape, or a Universal Serial Bus ("USB") drive or a combination of two or more of these. The storage device 906 may include removable or non-removable (or fixed) media, where appropriate. The storage device 906 may be internal or external to the computing device 800. In one or more embodiments, the storage device 906 is non-volatile, solid-state memory. In other embodiments, the storage device 906 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touchscreen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 810 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 810 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 9:
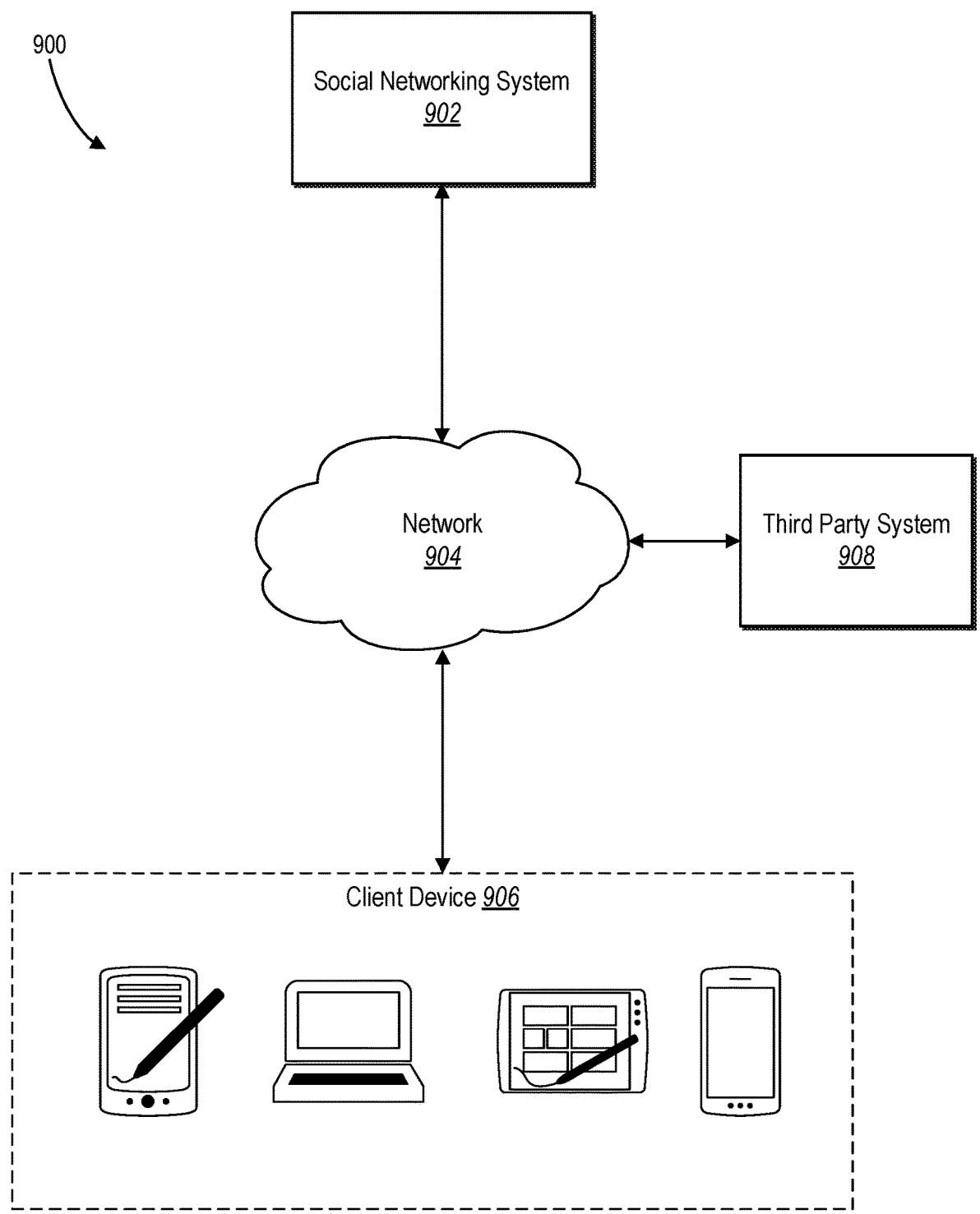
FIG. 9 illustrates a network environment of a social networking system according to one or more embodiments.

FIG. 9 illustrates an example network environment 900 of a social-networking system. Network environment 900 includes a client device 906, a social networking system 902, and a third-party system 908 connected to each other by a network 904. Although FIG. 9 illustrates a particular arrangement of client device 906, social networking system 902, third-party system 908, and network 904, this disclosure contemplates any suitable arrangement of client device 906, social networking system 902, third-party system 908, and network 904. As an example and not by way of limitation, two or more of client device 906, social networking system 902, and third-party system 908 may be connected to each other directly, bypassing network 904. As another example, two or more of client device 906, social networking system 902, and third-party system 908 may be physically or logically co-located with each other in whole or in part. Moreover, although FIG. 9 illustrates a particular number of client devices 906, social networking systems 902, third-party systems 908, and networks 904, this disclosure contemplates any suitable number of client devices 906, social networking systems 902, third-party systems 908, and networks 904. As an example and not by way of limitation, network environment 900 may include multiple client device 906, social networking systems 902, third-party systems 908, and networks 904.

This disclosure contemplates any suitable network 904. As an example and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906, social networking system 902, and third-party system 908 to communication network 904 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example and not by way of limitation, a client device 906 may include any of the computing devices discussed above in relation to FIG. 8. A client device 906 may enable a network user at client device 906 to access network 904. A client device 906 may enable its user to communicate with other users at other client devices 906.

In particular embodiments, client device 906 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 906 may enter a Uniform Resource Locator ("URL") or other address directing the web browser to a particular server (such as server, or a server associated with a third-party system 908), and the web browser may generate a Hyper Text Transfer Protocol ("HTTP") request and communicate the HTTP request to server. The server may accept the HTTP request and communicate to client device 906 one or more Hyper Text Markup Language ("HTML") files responsive to the HTTP request. Client device 906 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 902 may be a network-addressable computing system that can host an online social network. Social networking system 902 may generate, store, receive, and send social-networking data, such as, for example, user-profile data, concept-profile data, social-graph information, or other suitable data related to the online social network. Social networking system 902 may be accessed by the other components of network environment 900 either directly or via network 904. In particular embodiments, social networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, a social networking system 902, or a third-party system 908 to manage, retrieve, modify, add, or delete, the information stored in data store.

In particular embodiments, social networking system 902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 902 may provide users of the online social network the ability to communicate and interact with other users. In particular embodiments, users may join the online social network via social networking system 902 and then add connections (e.g., relationships) to a number of other users of social networking system 902 whom they want to be connected to. Herein, the term "friend" may refer to any other user of social networking system 902 with whom a user has formed a connection, association, or relationship via social networking system 902.

In particular embodiments, social networking system 902 may provide users with the ability to take actions on various types of items or objects, supported by social networking system 902. As an example and not by way of limitation, the items and objects may include groups or social networks to which users of social networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 902 or by an external system of third-party system 908, which is separate from social networking system 902 and coupled to social networking system 902 via a network 904.

In particular embodiments, social networking system 902 may be capable of linking a variety of entities. As an example and not by way of limitation, social networking system 902 may enable users to interact with each other as well as receive content from third-party systems 908 or other entities, or to allow users to interact with these entities through an application programming interfaces ("API") or other communication channels.

In particular embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating social networking system 902. In particular embodiments, however, social networking system 902 and third-party systems 908 may operate in conjunction with each other to provide social-networking services to users of social networking system 902 or third-party systems 908. In this sense, social networking system 902 may provide a platform, or backbone, which other systems, such as third-party systems 908, may use to provide social-networking services and functionality to users across the Internet.

In particular embodiments, a third-party system 908 may include a third-party content object provider. A third-party content object provider may include one or more sources of content objects, which may be communicated to a client device 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 902 also includes user-generated content objects, which may enhance a user's interactions with social networking system 902. User-generated content may include anything a user can add, upload, send, or "post" to social networking system 902. As an example and not by way of limitation, a user communicates posts to social networking system 902 from a client device 906. Posts may include data such as status updates or other textual data, location information, photos, videos, links, music or other similar data or media. Content may also be added to social networking system 902 by a third-party through a "communication channel," such as a newsfeed or stream.

In particular embodiments, social networking system 902 may include a variety of servers, sub-systems, programs, modules, logs, and data stores. In particular embodiments, social networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 902 may also include suitable components such as network interfaces, security mechanisms, load balancers, failover servers, management-and-network-operations consoles, other suitable components, or any suitable combination thereof. In particular embodiments, social networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 902 to one or more client devices 906 or one or more third-party system 908 via network 904. The web server may include a mail server or other messaging functionality for receiving and routing messages between social networking system 902 and one or more client devices 906. An API-request server may allow a third-party system 908 to access information from social networking system 902 by calling one or more APIs. An action logger may be used to receive communications from a web server about a user's actions on or off social networking system 902. In conjunction with the action log, a third-party-content-object log may be maintained of user exposures to third-party-content objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of social networking system 902. A privacy setting of a user determines how particular information associated with a user can be shared. The authorization server may allow users to opt in to or opt out of having their actions logged by social networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client devices 906 associated with users. Advertisement-pricing modules may combine social information, the current time, location information, or other suitable information to provide relevant advertisements, in the form of notifications, to a user.

Figure 10:
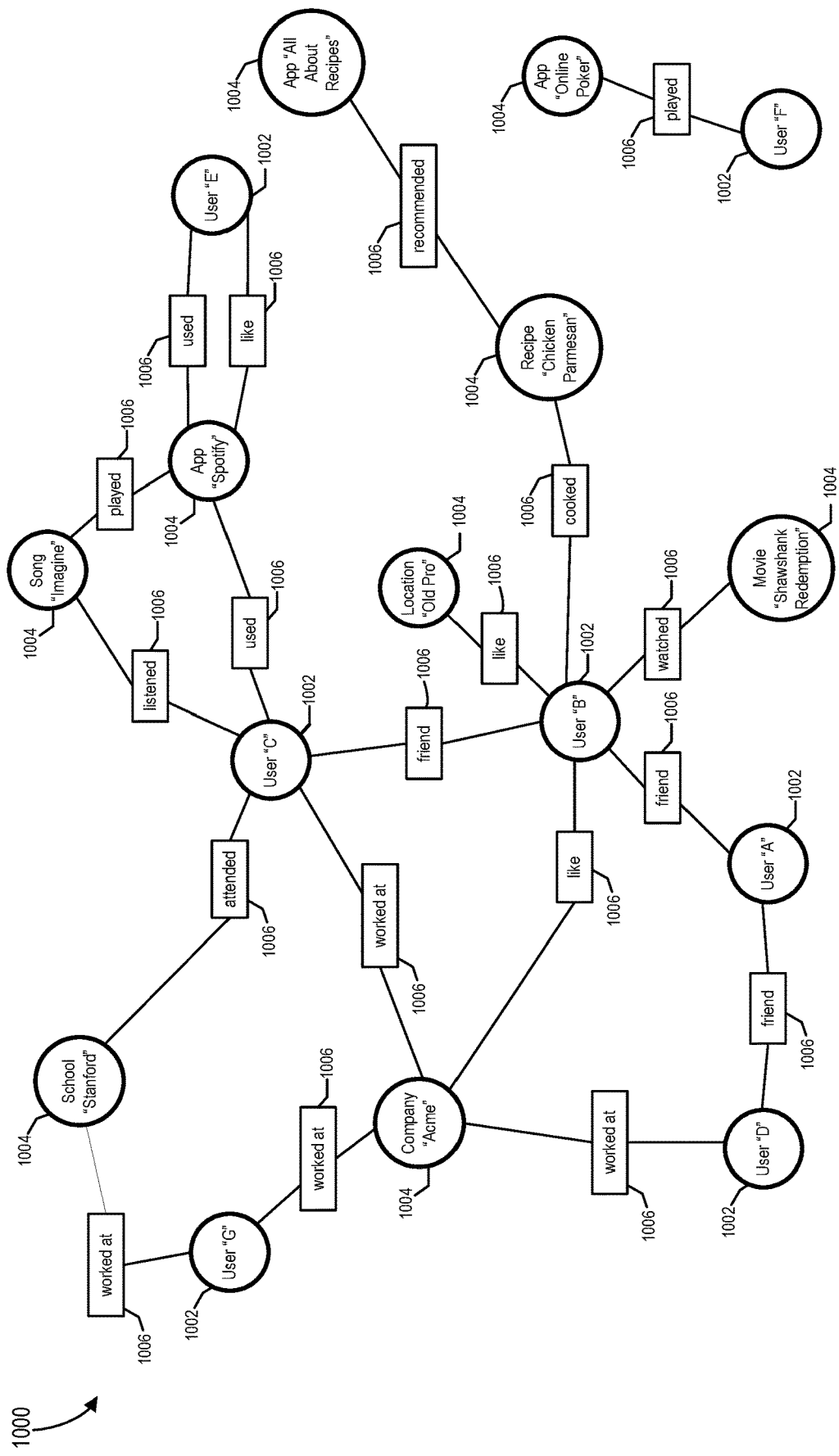
FIG. 10 illustrates an example social graph for a social networking system in accordance with one or more embodiments.

FIG. 10 illustrates example social graph 1000. In particular embodiments, social networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social networking system 902, client device 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social networking system 902. As an example and not by way of limitation, a user may be an individual (human user), an entity (e.g., an enterprise, business, or third-party application), or a group (e.g., of individuals or entities) that interacts or communicates with or over social networking system 902. In particular embodiments, when a user registers for an account with social networking system 902, social networking system 902 may create a user node 1002 corresponding to the user, and store the user node 1002 in one or more data stores. Users and user nodes 1002 described herein may, where appropriate, refer to registered users and user nodes 1002 associated with registered users. In addition, or as an alternative, users and user nodes 1002 described herein may, where appropriate, refer to users that have not registered with social networking system 902. In particular embodiments, a user node 1002 may be associated with information provided by a user or information gathered by various systems, including social networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social networking system 902 or a third-party website associated with a web-application server); an entity (such as, for example, a person, business, group, sports team, or celebrity); a resource (such as, for example, an audio file, video file, digital photo, text file, structured document, or application) which may be located within social networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social networking system 902. Profile pages may also be hosted on third-party websites associated with a third-party system 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 906 to send to social networking system 902 a message indicating the user's action. In response to the message, social networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social networking system 902 may send a "friend request" to the second user. If the second user confirms the "friend request," social networking system 902 may create an edge 1006 connecting the first user's user node 1002 to the second user's user node 1002 in social graph 1000 and store edge 1006 as social-graph information in one or more of data stores. In the example of FIG. 9, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client device 906) may indicate that he or she likes the concept represented by the concept node 1004 by clicking or selecting a "Like" icon, which may cause the user's client device 906 to send to social networking system 902 a message indicating the user's liking of the concept associated with the concept-profile page. In response to the message, social networking system 902 may create an edge 1006 between user node 1002 associated with the user and concept node 1004, as illustrated by "like" edge 1006 between the user and concept node 1004. In particular embodiments, social networking system 902 may store an edge 1006 in one or more data stores. In particular embodiments, an edge 1006 may be automatically formed by social networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 902) or RSVP (e.g., through social networking system 902) to an event associated with the advertisement. In addition or as an alternative, an advertisement may include social-networking-system context directed to the user. As an example and not by way of limitation, an advertisement may display information about a friend of the user within social networking system 902 who has taken an action associated with the subject matter of the advertisement.

In particular embodiments, social networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 902 may calculate a coefficient based on a user's actions. Social networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social networking system 902 may analyze a user's actions to determine whether one or more of the actions indicate an affinity for subject matter, content, other users, and so forth. As an example and not by way of limitation, if a user may make frequently posts content related to "coffee" or variants thereof, social networking system 902 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 902 may calculate a coefficient based on the type of relationship between particular objects. Referencing the social graph 1000, social networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 902 may determine that the user has a higher coefficient with respect to the first photo than the second photo because having a tagged-in-type relationship with content may be assigned a higher weight and/or rating than having a like-type relationship with content. In particular embodiments, social networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 906 of the user). A first user may be more interested in other users or concepts that are closer to the first user. As an example and not by way of limitation, if a user is one mile from an airport and two miles from a gas station, social networking system 902 may determine that the user has a higher coefficient for the airport than the gas station based on the proximity of the airport to the user.

In particular embodiments, social networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 902 may provide information that is relevant to user's interests and current circumstances, increasing the likelihood that they will find such information of interest. In particular embodiments, social networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social networking system 902 may calculate the coefficient (or access the coefficient information if it has previously been calculated and stored). In particular embodiments, social networking system 902 may measure an affinity with respect to a particular process. Different processes (both internal and external to the online social network) may request a coefficient for a particular object or set of objects. Social networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or acts disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 902 may send a request to the data store for the object. The request may identify the user associated with the request and may only be sent to the user (or a client device 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a broadcaster device to:
   transmit to a social networking system a live video stream for broadcast to a plurality of viewers;
   receive from the social networking system a video clip of a reaction to the live video stream by a viewer of the plurality of viewers, the video clip captured by the viewer using a viewer device while the viewer device presents the live video stream;
   present the video clip as a movable graphical element that moves in response to a user interaction by a broadcasting user within a graphical user interface of the broadcaster device, wherein the movable graphical element is overlaid on the live video stream while the broadcaster device captures the live video stream; and
   transmit to the social networking system an indication to add the video clip as a movable graphical element overlaid on the live video stream presented on a plurality of viewer devices,
   wherein the indication directs the social networking system to transmit the video clip to the plurality of viewer devices such that the plurality of viewer devices present the video clip as a movable graphical element that moves in response to user interaction by one or more of the plurality of viewers within graphical user interfaces, wherein the movable graphical element is overlaid on the live video stream presented on each of the plurality of viewer devices.

2. The non-transitory computer readable medium of claim 1, further comprising instructions that, when executed by the at least one processor, cause the broadcaster device to transmit to the social networking system the indication to add the video clip as the movable graphical element overlaid on the live video stream by transmitting a stream-modification indication to add the video clip to the live video stream for transmission to a viewer device of the plurality of viewer devices as a movable graphical element that changes location within a graphical user interface of the viewer device in response to detecting a user interaction with the movable graphical element.

3. The non-transitory computer readable medium of claim 1, further comprising instructions that, when executed by the at least one processor, cause the broadcaster device to:
receive from the social networking system an additional video clip of an additional reaction to the live video stream by an additional viewer of the plurality of viewers, the additional video clip captured by the additional viewer using an additional viewer device while the additional viewer device presents the live video stream; and
present the additional video clip as an additional movable graphical element within the graphical user interface of the broadcaster device overlaid on the live video stream while the broadcaster device captures the live video.

4. The non-transitory computer readable medium of claim 1, further comprising instructions that, when executed by the at least one processor, cause the broadcaster device to repeatedly present the video clip for a duration of the video clip as the movable graphical element moves across the graphical user interface.

5. The non-transitory computer readable medium of claim 1, further comprising instructions that, when executed by the at least one processor, cause the broadcaster device to:
detect a first user interaction by the broadcasting user with the movable graphical element during presentation of the video clip as the movable graphical element within the graphical user interface; and
in response to the first user interaction:
change a location of the video clip as the movable graphical element within the graphical user interface; or
stop a motion of the video clip as the movable graphical element across the graphical user interface.

6. The non-transitory computer readable medium of claim 5, further comprising instructions that, when executed by the at least one processor, cause the broadcaster device to:
detect a termination of the first user interaction with the movable graphical element; and
in response to the termination of the first user interaction, return the video clip as the movable graphical element to a previous location or permitting permit continued motion of the video clip as the movable graphical element across the graphical user interface without detecting further user interaction with the movable graphical element.

7. The non-transitory computer readable medium of claim 5, wherein the first user interaction comprises a touch gesture with respect to the movable graphical element during the presentation of the video clip as the movable graphical element within the graphical user interface.

8. The non-transitory computer readable medium of claim 5, further comprising instructions that, when executed by the at least one processor, cause the broadcaster device to:
detect a second user interaction by the broadcasting user with the movable graphical element; and
in response to detecting the second user interaction:
add the viewer to a multi-user-live stream comprising the live video stream from the broadcaster device and an additional live video stream from the viewer device;
initiate a communication with the viewer;
grant permission for the video clip to be included in the live video stream for the plurality of viewers; or
grant permission for the viewer to add video clips of reactions to future live video streams from a broadcaster of the live video stream.

9. A system comprising:
at least one processor; and
at least one non-transitory computer-readable storage medium storing instructions thereon that, when executed by the at least one processor, cause the system to:
receive, from a broadcaster device, a live video stream for broadcast to a plurality of viewers and a permission indication to add video clips from one or more of the plurality of viewers to the live video stream;
transmit, to a plurality of viewer devices for the plurality of viewers, the live video stream received from the broadcaster device;
receive, from a viewer device of the plurality of viewer devices, a video clip of a reaction to the live video stream by a viewer of the plurality of viewers, the video clip captured by the viewer device while the viewer device presents the live video stream to the viewer;
transmit the video clip to the broadcaster device for presentation by the broadcaster device as a movable graphical element that moves in response to a user interaction by a broadcasting user within a graphical user interface of the broadcaster device, wherein the movable graphical element is overlaid on the live video stream; and
based on the permission indication to add video clips from one or more of the plurality of viewers to the live video stream, transmit the video clip to the plurality of viewer devices for presentation by the plurality of viewer devices as a movable graphical element that moves in response to user interaction by one or more of the plurality of viewers within graphical user interfaces, wherein the movable graphical element is overlaid on the live video stream from the broadcaster device.

10. The system of claim 9, further comprising instructions that, when executed by the at least one processor, cause the system to transmit the video clip to the plurality of viewer devices for presentation by the plurality of viewer devices as the movable graphical element by transmitting the video clip to a viewer device of the plurality of viewer devices for repeated presentation of the video clip for a duration of the video clip as the movable graphical element moves across a graphical user interface of the viewer device.

11. The system of claim 9, further comprising instructions that, when executed by the at least one processor, cause the system to direct the movable graphical element to continuously move in a floating motion toward an edge of a graphical user interface of the broadcaster device while the system receives the live video stream from the broadcaster device.

12. The system of claim 9, further comprising instructions that, when executed by the at least one processor, cause the system to activate on the plurality of viewer devices a reaction-video element to capture video clips of reactions to the live video stream.

13. The system of claim 9, further comprising instructions that, when executed by the at least one processor, cause the system to selectively activate, on one or more of the plurality of viewer devices, a reaction-video element to capture video clips of reactions to the live video stream.

14. The system of claim 13, further comprising instructions that, when executed by the at least one processor, cause the system to selectively activate, on the one or more of the plurality of viewer devices, the reaction-video element to capture video clip of reactions to the live video stream abased on one or more of:
- determining that fewer than a threshold number of the plurality of viewers are viewing the live video stream;
- determining that the one or more of the plurality of viewer devices correspond to viewer accounts of friends or followers of a broadcaster account corresponding to the broadcaster device;
- determining that the broadcaster account has granted permission for viewer accounts corresponding to the one or more of the plurality of viewer devices to add video clips of reactions to the live video stream for the plurality of viewers; or
- determining that the one or more of the plurality of viewer devices correspond to viewer accounts with affinity coefficients that exceed a threshold, the affinity coefficients relative to a broadcaster account corresponding to the broadcaster device.

15. A non-transitory computer readable medium storing instructions thereon that, when executed by at least one processor, cause a computer system to:
- receive, from a broadcaster device, a live video stream for broadcast to a plurality of viewers and a permission indication to add video clips from one or more of the plurality of viewers to the live video stream;
- transmit, to a plurality of viewer devices for the plurality of viewers, the live video stream received from the broadcaster device;
- receive, from a viewer device of the plurality of viewer devices, a video clip of a reaction to the live video stream by a viewer of the plurality of viewers, the video clip captured by the viewer device while the viewer device presents the live video stream to the viewer;
- transmit the video clip to the broadcaster device for presentation by the broadcaster device as a movable graphical element that moves in response to a user interaction by a broadcasting user within a graphical user interface of the broadcaster device, wherein the movable graphical element is overlaid on the live video stream; and
- based on the permission indication to add video clips from one or more of the plurality of viewers to the live video stream, transmit the video clip to the plurality of viewer devices for presentation by the plurality of viewer devices as a movable graphical element that moves in response to user interaction by one or more of the plurality of viewers within graphical user interfaces, wherein the movable graphical element is overlaid on the live video stream from the broadcaster device.

16. The non-transitory computer readable medium of claim 15, further comprising instructions that, when executed by the at least one processor, cause the computer system to transmit the video clip to the plurality of viewer devices for presentation by the plurality of viewer devices as the movable graphical element by transmitting the video clip to a viewer device of the plurality of viewer devices for repeated presentation of the video clip for a duration of the video clip as the movable graphical element moves across a graphical user interface of the viewer device.

17. The non-transitory computer readable medium of claim 15, further comprising instructions that, when executed by the at least one processor, cause the computer system to direct the movable graphical element to continuously move in a floating motion toward an edge of a graphical user interface of the broadcaster device while the system receives the live video stream from the broadcaster device.

18. The non-transitory computer readable medium of claim 15, further comprising instructions that, when executed by the at least one processor, cause the computer system to activate on the plurality of viewer devices a reaction-video element to capture video clips of reactions to the live video stream.

19. The non-transitory computer readable medium of claim 15, further comprising instructions that, when executed by the at least one processor, cause the computer system to selectively activate, on one or more of the plurality of viewer devices, a reaction-video element to capture video clips of reactions to the live video stream.

20. The non-transitory computer readable medium of claim 19, further comprising instructions that, when executed by the at least one processor, cause the computer system to selectively activate, on the one or more of the plurality of viewer devices, the reaction-video element to capture video clip of reactions to the live video stream based on one or more of:
- determining that fewer than a threshold number of the plurality of viewers are viewing the live video stream;
- determining that the one or more of the plurality of viewer devices correspond to viewer accounts of friends or followers of a broadcaster account corresponding to the broadcaster device;
- determining that the broadcaster account has granted permission for viewer accounts corresponding to the one or more of the plurality of viewer devices to add video clips of reactions to the live video stream for the plurality of viewers; or
- determining that the one or more of the plurality of viewer devices correspond to viewer accounts with affinity coefficients that exceed a threshold, the affinity coefficients relative to a broadcaster account corresponding to the broadcaster device.

* * * * *